US012677299B2

(12) United States Patent
He et al.

(10) Patent No.: US 12,677,299 B2
(45) Date of Patent: Jul. 7, 2026

(54) RESOURCE SELECTION METHOD AND APPARATUS

(71) Applicant: Huawei Technologies Co., Ltd., Shenzhen (CN)

(72) Inventors: Hongli He, Beijing (CN); Xueru Li, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 339 days.

(21) Appl. No.: 18/394,911

(22) Filed: Dec. 22, 2023

(65) Prior Publication Data

US 2024/0155650 A1     May 9, 2024

Related U.S. Application Data

(63) Continuation of application No. PCT/CN2022/084607, filed on Mar. 31, 2022.

(30) Foreign Application Priority Data

Jun. 24, 2021    (CN) .......................... 202110702495.2
Aug. 6, 2021    (CN) .......................... 202110904358.7

(51) Int. Cl.
H04W 4/00          (2018.01)
H04W 72/25       (2023.01)
(Continued)

(52) U.S. Cl.
CPC ......... H04W 72/25 (2023.01); H04W 72/542 (2023.01); H04W 72/563 (2023.01)

(58) Field of Classification Search
USPC ................................................. 370/329, 330
See application file for complete search history.

(56) References Cited

U.S. PATENT DOCUMENTS

2022/0015071 A1 *    1/2022    Hui ........................ H04W 72/56
2022/0330381 A1 *    10/2022    Xiong ................... H04W 88/06
(Continued)

FOREIGN PATENT DOCUMENTS

CN          111526540 A        8/2020
WO        2020191769 A1      10/2020

OTHER PUBLICATIONS

Fraunhofer HHI et al, "Resource Allocation Enhancements for Mode 2", 3GPP TSG RAN WG1 Meeting #106bis-e R1-2109431, e-Meeting, Oct. 11-19, 2021, total 23 pages.
(Continued)

*Primary Examiner* — Charles C Jiang
(74) *Attorney, Agent, or Firm* — Slater Matsil, LLP

(57) ABSTRACT

A resource selection method includes: A first terminal device determines an initial candidate resource set including M resources, and determines, based on an RSRP and a collision index that are associated with SCI received in a sensing window, whether to exclude an $i^{th}$ resource in the M resources from the initial candidate resource set, to obtain a candidate available resource set. The collision index is an index of a collision between a reserved resource indicated by the SCI received in the sensing window and an $i^{th}$ periodic resource. The $i^{th}$ periodic resource includes the $i^{th}$ resource and a resource obtained after the $i^{th}$ resource is extended based on a preset first period. Herein, M is a positive integer, and i is a positive integer from 1 to M.

20 Claims, 7 Drawing Sheets

(51) Int. Cl.
H04W 72/542 (2023.01)
H04W 72/563 (2023.01)

(56) References Cited

U.S. PATENT DOCUMENTS

2022/0377704 A1 * 11/2022 Xue ...................... H04W 72/02
2023/0362903 A1 * 11/2023 Ding .................... H04W 72/02

OTHER PUBLICATIONS

3GPP TSG RAN WG1 Meeting #105-e, R1-2104561, "Resource Allocation Enhancements for Mode 2", Fraunhofer HHI, Fraunhofer IIS, e-Meeting, May 10-27, 2021, XP052006223, total 16 pages.

* cited by examiner

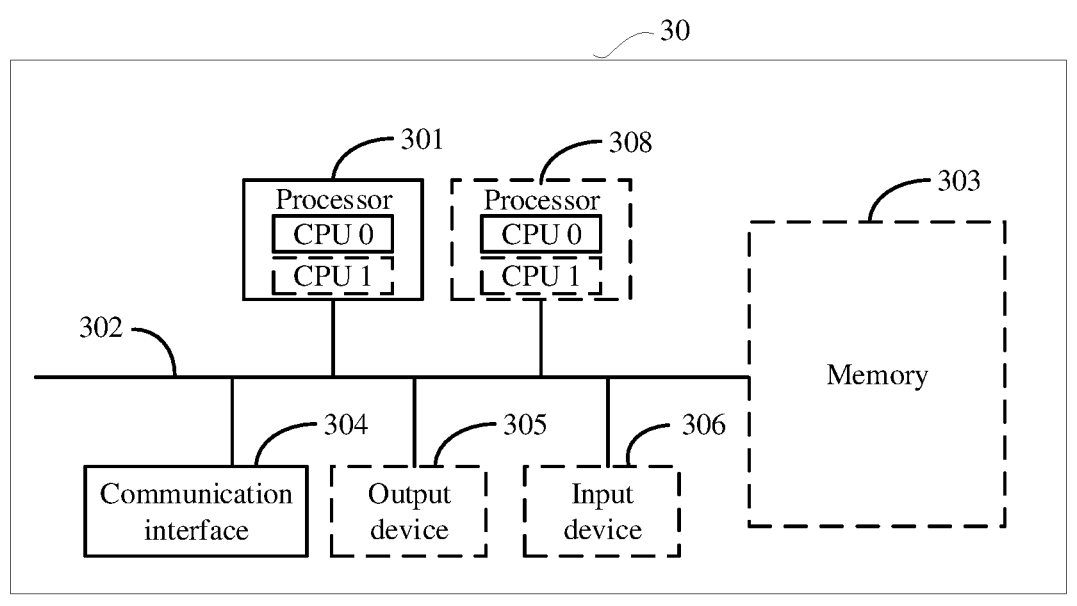

FIG. 3

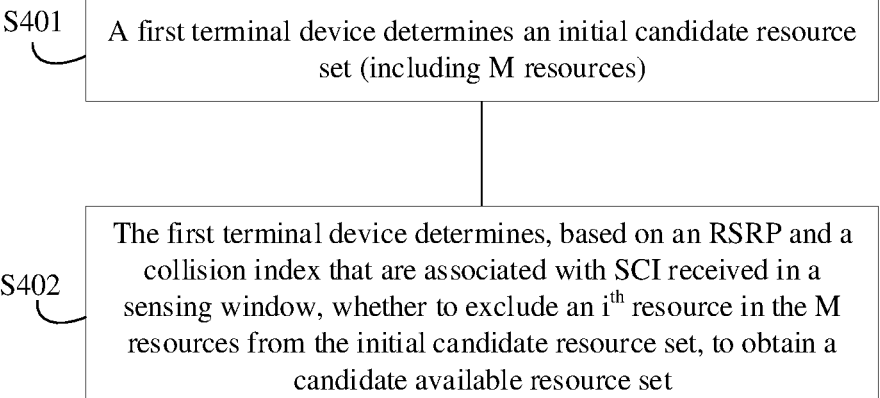

FIG. 4a

| S401 | A first terminal device determines an initial candidate resource set (including M resources) |
|---|---|

| S402 | The first terminal device determines, based on an RSRP and a collision index that are associated with SCI received in a sensing window, whether to exclude an $i^{th}$ resource in the M resources from the initial candidate resource set, to obtain a candidate available resource set |
|---|---|

Selection
window

▨ Resource R1        ▧ Resource R3        ⊟ Resource R5

⊞ Resource R2        ▨ Resource R4

FIG. 4b

RESOURCE SELECTION METHOD AND APPARATUS

CROSS-REFERENCE TO RELATED APPLICATIONS

This application is a continuation of International Application No. PCT/CN2022/084607, filed on Mar. 31, 2022, which claims priority to Chinese Patent Application No. 202110702495.2, filed on Jun. 24, 2021 and Chinese Patent Application No. 202110904358.7, filed on Aug. 6, 2021. All of the aforementioned patent applications are hereby incorporated by reference in their entireties.

TECHNICAL FIELD

This application relates to the field of communication technologies, and in particular, to a resource selection method and apparatus.

BACKGROUND

In the 3rd generation partnership project (3GPP) sidelink (SL) release (R) 16, two resource allocation modes are defined: Mode 1 and Mode 2. In Mode 1, an access network device (for example, a base station) performs centralized resource scheduling on SL transmission.

In Mode 2, a sending terminal selects an SL resource for data transmission through channel sensing and selection. Specifically, the sending terminal listens, in a sensing window, to sidelink control information (SCI) sent by another terminal, to learn of a location of a reserved resource of the another terminal, thereby determining an available resource in the selection window. The available resource determined by the sending terminal in the selection window may not collide with the reserved resource of the another terminal.

However, for a periodic service, after the resource in the selection window is periodically extended, frequent collisions may occur between the resource and a periodic reserved resource of the another terminal.

SUMMARY

This application provides a resource selection method and apparatus, to reduce a collision between reserved resources of terminal devices and subsequent resource reselection, thereby improving communication efficiency.

According to a first aspect, a resource selection method is provided. The method may be performed by a first terminal device; or may be performed by a component of a first terminal device, for example, a processor, a chip, or a chip system of the first terminal device; or may be implemented by a logical module or software that can implement all or some functions of a first terminal device. The method includes: determining an initial candidate resource set including M resources; and determining, based on a reference signal received power RSRP and a collision index that are associated with sidelink control information SCI received in a sensing window, whether to exclude an $i^{th}$ resource in the M resources from the initial candidate resource set, to obtain a candidate available resource set. The collision index is an index of a collision between a reserved resource indicated by the SCI received in the sensing window and an $i^{th}$ periodic resource. The $i^{th}$ periodic resource includes the $i^{th}$ resource and a resource obtained after the $i^{th}$ resource is extended based on a preset first period. Herein, M is a positive integer, and i is a positive integer from 1 to M.

Based on this solution, resource selection is performed with reference to the RSRP associated with the SCI received in the sensing window and an index of a collision between the reserved resource indicated by the SCI received in the sensing window and a periodic resource corresponding to a resource in a selection window. Therefore, a case in which the periodic resource corresponding to the resource in the selection window collides with a reserved resource of another terminal device can be more comprehensively evaluated, and a resource with fewer collisions is selected as much as possible, to reduce a collision between reserved resources of terminal devices and subsequent resource reselection, thereby improving communication efficiency.

With reference to the first aspect, in some implementations of the first aspect, the determining, based on RSRP and a collision index that are associated with SCI received in a sensing window, whether to exclude an $i^{th}$ resource from the initial candidate resource set includes: determining, based on the RSRP associated with the SCI received in the sensing window, the collision index, a first priority corresponding to the SCI received in the sensing window, and a preset priority, whether to exclude the $i^{th}$ resource from the initial candidate resource set.

Based on this implementation, during resource selection, the preset priority and the first priority corresponding to the SCI received in the sensing window are further considered. Therefore, a case in which the periodic resource corresponding to the resource in the selection window collides with a reserved resource of another terminal device can be more comprehensively evaluated from a plurality of perspectives, to further reduce the collision between reserved resources of terminal devices and subsequent resource reselection.

With reference to the first aspect, in some implementations of the first aspect, the SCI received in the sensing window includes a plurality of pieces of SCI. The plurality of pieces of SCI form X SCI sets. Reserved resources corresponding to the X SCI sets partially or completely overlap the $i^{th}$ periodic resource. SCI included in an $x^{th}$ SCI set in the X SCI sets corresponds to a same first priority. The collision index includes X collision indices. The X collision indices are in a one-to-one correspondence with the X SCI sets. Herein, X is a positive integer.

The determining, based on the RSRP associated with the SCI received in the sensing window, the collision index, a first priority corresponding to the SCI received in the sensing window, and a preset priority, whether to exclude the $i^{th}$ resource from the initial candidate resource set includes: determining a first evaluation index of the $i^{th}$ resource based on an RSRP associated with the $x^{th}$ SCI set in the X SCI sets, a collision index corresponding to the $x^{th}$ SCI set, the first priority corresponding to the $x^{th}$ SCI set, and the preset priority; and determining, based on the first evaluation index of the $i^{th}$ resource, whether to exclude the $i^{th}$ resource from the initial candidate resource set. Herein, the first priority corresponding to the $x^{th}$ SCI set is a first priority corresponding to the SCI included in the $x^{th}$ SCI set, and x is a positive integer from 1 to X.

With reference to the first aspect, in some implementations of the first aspect, the collision index corresponding to the $x^{th}$ SCI set is determined based on a quantity of times that the $i^{th}$ periodic resource collides with a first reserved resource in a first window. The first reserved resource is a reserved resource corresponding to the $x^{th}$ SCI set. The reserved resource corresponding to the $x^{th}$ SCI set includes a reserved resource indicated by each piece of SCI in the $x^{th}$ SCI set.

With reference to the first aspect, in some implementations of the first aspect, the collision index corresponding to the $x^{th}$ SCI set includes a first collision sub-index and/or a second collision sub-index. That the first collision sub-index is determined based on a quantity of times that the $i^{th}$ periodic resource collides with a first reserved resource in a first window includes that the first collision sub-index is determined based on a quantity of resources that are located in the first window in the $i^{th}$ periodic resource, and the quantity of times that the $i^{th}$ periodic resource collides with the first reserved resource in the first window. That the second collision sub-index is determined based on the quantity of times that the $i^{th}$ periodic resource collides with the first reserved resource in the first window includes that the second collision sub-index is determined based on a quantity of resources that are located in the first window in the first reserved resource, and the quantity of times that the $i^{th}$ periodic resource collides with the first reserved resource in the first window.

With reference to the first aspect, in some implementations of the first aspect, the first collision sub-index, quantity of resources that are located in the first window in the $i^{th}$ periodic resource, and the quantity of times that the $i^{th}$ periodic resource collides with the first reserved resource in the first window satisfy the following formula:

$$a_x=C/N1.$$

Herein, $a_x$ is the first collision sub-index, N1 is the quantity of resources that are located in the first window in the $i^{th}$ periodic resource, and C is the quantity of times that the $i^{th}$ periodic resource collides with the first reserved resource in the first window.

The second collision sub-index, the quantity of resources that are located in the first window in the first reserved resource, and the quantity of times that the $i^{th}$ periodic resource collides with the first reserved resource in the first window satisfy the following formula:

$$b_x=C/N2.$$

Herein, $b_x$ is the second collision sub-index, N2 is the quantity of resources that are located in the first window in the first reserved resource, and C is the quantity of times that the $i^{th}$ periodic resource collides with the first reserved resource in the first window.

With reference to the first aspect, in some implementations of the first aspect, the first evaluation index, the RSRP associated with the $x^{th}$ SCI set in the X SCI sets, the collision index corresponding to the $x^{th}$ SCI set, the first priority corresponding to the $x^{th}$ SCI set, and the preset priority satisfy the following formula:

$$E = \sum_{x=1}^{X} [-A(a_x + b_x) RSRP_x + G(prio_{TX}, prio_x)].$$

Herein, E is the first evaluation index, A is a constant greater than 0, $a_x$ is the first collision sub-index corresponding to the $x^{th}$ SCI set, $b_x$ is the second collision sub-index corresponding to the $x^{th}$ SCI set, $RSRP_x$ is the RSRP associated with the $x^{th}$ SCI set, $prio_{TX}$ is the preset priority, $prio_x$ is the first priority corresponding to the $x^{th}$ SCI set, $G(Prio_{TX}, prio_x)$ is a preset value related to $prio_{TX}$ and $prio_x$, and $G(prio_{TX}, prio_x)$ and increases or remains unchanged as the preset priority increases, and decreases or remains unchanged as the first priority corresponding to the $x^{th}$ SCI set increases.

With reference to the first aspect, in some implementations of the first aspect, the determining a first evaluation index of an $i^{th}$ resource based on an RSRP associated with an $x^{th}$ SCI set in X SCI sets, a collision index corresponding to the $x^{th}$ SCI set, a first priority corresponding to the $x^{th}$ SCI set, and a preset priority includes: determining, based on the RSRP associated with the $x^{th}$ SCI set in the X SCI sets, the collision index corresponding to the $x^{th}$ SCI set, the first priority corresponding to the $x^{th}$ SCI set, and the preset priority, the second evaluation index of the $i^{th}$ resource corresponding to the $x^{th}$ SCI set; and determining the first evaluation index based on the X second evaluation indices of the $i^{th}$ resource corresponding to the X SCI sets.

With reference to the first aspect, in some implementations of the first aspect, the second evaluation index corresponding to the $x^{th}$ SCI set and corresponding to the $i^{th}$ resource is a non-incremental function of an RSRP associated with the $x^{th}$ SCI set, a first collision sub-index corresponding to the $x^{th}$ SCI set, and a second collision sub-index corresponding to the $x^{th}$ SCI set, the second evaluation index corresponding to the $x^{th}$ SCI set decreases or remains unchanged as the first priority corresponding to the $x^{th}$ SCI set increases, and the second evaluation index corresponding to the $x^{th}$ SCI set increases or remains unchanged as the preset priority increases.

With reference to the first aspect, in some implementations of the first aspect, the second evaluation index of the $i^{th}$ resource corresponding to the $x^{th}$ SCI set, the RSRP associated with the $x^{th}$ SCI set in the X SCI sets, the collision index corresponding to the $x^{th}$ SCI set, the first priority corresponding to the $x^{th}$ SCI set, and the preset priority satisfy the following formula:

$$E_x=-A(a_x+b_x) RSRP_x+G(prio_{TX},prio_x).$$

Herein, $E_x$ is the second evaluation index corresponding to the $x^{th}$ SCI set, A is a constant greater than 0, $a_x$ is the first collision sub-index corresponding to the $x^{th}$ SCI set, $b_x$ is the second collision sub-index corresponding to the $x^{th}$ SCI set, $RSRP_x$ is the RSRP associated with the $x^{th}$ SCI set, $prio_{TX}$ is the preset priority, $prio_x$ is the first priority corresponding to the $x^{th}$ SCI set, $G(prio_{TX}, prio_x)$ is a preset value related to $prio_{TX}$ and $prio_x$, and $G(prio_{TX}, prio_x)$ increases or remains unchanged as the preset priority increases, and decreases or remains unchanged as the first priority corresponding to the $x^{th}$ SCI set increases.

With reference to the first aspect, in some implementations of the first aspect, the first evaluation index is a sum of the X second evaluation indices; the first evaluation index is an average value of the X second evaluation indices; the first evaluation index is a maximum value in the X second evaluation indices; or the first evaluation index is a minimum value in the X second evaluation indices.

With reference to the first aspect, in some implementations of the first aspect, the determining, based on the first evaluation index of the $i^{th}$ resource, whether to exclude the $i^{th}$ resource from the initial candidate resource set includes: when the first evaluation index of the $i^{th}$ resource is less than or equal to a first threshold, excluding the $i^{th}$ resource from the initial candidate resource set; or when the first evaluation index of the $i^{th}$ resource is less than a first threshold, excluding the $i^{th}$ resource from the initial candidate resource set.

With reference to the first aspect, in some implementations of the first aspect, the method further includes: reducing the first threshold when a quantity of resources included in the candidate available resource set is less than or equal to Y·M; or reducing the first threshold when a quantity of resources included in the candidate available resource set is less than Y·M, where Y is a preconfigured positive number less than 1.

Based on this implementation, after the first threshold is reduced, resource selection may be performed again until the quantity of resources included in the candidate available resource set is greater than or equal to Y·M, to ensure that the candidate available resource set has sufficient available resources.

With reference to the first aspect, in some implementations of the first aspect, SCI included in a same SCI set in the X SCI sets corresponds to a same first priority, a same period, a same time domain resource allocation indication, and a same frequency domain resource allocation indication, and reserved resources indicated by the SCI included in the same SCI set partially or completely overlap.

With reference to the first aspect, in some implementations of the first aspect, the SCI received in the sensing window includes first SCI. The $i^{th}$ periodic resource partially or completely overlaps a second reserved resource in the first window. The second reserved resource is a reserved resource indicated by the first SCI. The determining, based on RSRP and a collision index that are associated with SCI, whether to exclude an $i^{th}$ resource in the M resources from the initial candidate resource set includes: when the RSRP associated with the first SCI is greater than or equal to a second threshold, excluding the $i^{th}$ resource from the initial candidate resource set; or when the RSRP associated with the first SCI is greater than a second threshold, excluding the $i^{th}$ resource from the initial candidate resource set, where the second threshold is determined based on the collision index.

With reference to the first aspect, in some implementations of the first aspect, that the second threshold is determined based on the collision index includes that the second threshold is determined based on the collision index, a first priority corresponding to the first SCI, and a preset priority.

Based on this implementation, during resource selection, the preset priority and the first priority corresponding to the first SCI are further considered. Therefore, a case in which the periodic resource corresponding to the resource in the selection window collides with a reserved resource of another terminal device can be more comprehensively evaluated from a plurality of perspectives, to further reduce the collision between reserved resources of terminal devices and subsequent resource reselection.

With reference to the first aspect, in some implementations of the first aspect, the collision index includes a third collision sub-index and a fourth collision sub-index. The third collision sub-index and the fourth collision sub-index are determined based on a quantity of times that the $i^{th}$ periodic resource collides with the second reserved resource in the first window. That the second threshold is determined based on the collision index includes that the second threshold is determined based on a collision index interval corresponding to the collision index. The collision index interval corresponding to the collision index includes a first collision index interval and a second collision index interval. The first collision index interval is a collision index interval in which the third collision sub-index is located. The second collision index interval is a collision index interval in which the fourth collision sub-index is located.

With reference to the first aspect, in some implementations of the first aspect, an RSRP threshold list to which the second threshold belongs includes $P·P·D_1·D_2$ thresholds, P is a quantity of priorities supported on a sidelink, $D_1$ is a quantity of collision index intervals included in a first collision index interval group, and $D_2$ is a quantity of collision index intervals included in a second collision index interval group.

The first collision index interval group is a collision index interval group to which the first collision index interval belongs. The second collision index interval group is a collision index interval group to which the second collision index interval belongs. The preset priority is one of priorities supported on the sidelink. The first priority corresponding to the first SCI is one of the priorities supported on the sidelink.

With reference to the first aspect, in some implementations of the first aspect, the second threshold is a $K^{th}$ threshold in the RSRP threshold list to which the second threshold belongs.

Herein, $K=prio_{RX}+(prio_{TX}-1)·P+d_1·P·P+d_2·P·P·D_1$.

Herein, $prio_{RX}$ is the first priority corresponding to the first SCI, $prio_{TX}$ is the preset priority, $d_1$ is an interval index of the first collision index interval in the first collision index interval group, $d_1 \in [0, D_1-1]$, $d_2$ is an interval index of the second collision index interval in the second collision index interval group, and $d_2 \in [0, D_2-1]$.

With reference to the first aspect, in some implementations of the first aspect, that the second threshold is determined based on the collision index includes that the second threshold is determined based on a collision interval corresponding to the collision index.

The collision index interval corresponding to the collision index is a collision index interval in which a maximum collision index in a third collision sub-index and a fourth collision sub-index is located, and the third collision sub-index and the fourth collision sub-index are determined based on a quantity of times that the $i^{th}$ periodic resource collides with the second reserved resource in the first window.

Alternatively, the collision index interval corresponding to the collision index is a collision index interval in which a minimum collision index in a third collision sub-index and a fourth collision sub-index is located, and the third collision sub-index and the fourth collision sub-index are determined based on a quantity of times that the $i^{th}$ periodic resource collides with the second reserved resource in the first window.

Alternatively, the collision index interval corresponding to the collision index is a collision index interval in which an average collision index of a third collision sub-index and a fourth collision sub-index is located, and the third collision sub-index and the fourth collision sub-index are determined based on a quantity of times that the $i^{th}$ periodic resource collides with the second reserved resource in the first window.

Alternatively, when the preset priority is lower than or equal to the first priority corresponding to the first SCI, the collision index interval corresponding to the collision index is a collision index interval in which a fourth collision sub-index is located, and the fourth collision sub-index is determined based on a quantity of times that the $i^{th}$ periodic resource collides with the second reserved resource in the first window.

Alternatively, when the preset priority is higher than the first priority corresponding to the first SCI, the collision index interval corresponding to the collision index is a collision index interval in which a third collision sub-index is located, and the third collision sub-index is determined based on a quantity of times that the $i^{th}$ periodic resource collides with the second reserved resource in the first window.

With reference to the first aspect, in some implementations of the first aspect, an RSRP threshold list to which the second threshold belongs includes P·P·D thresholds. Herein, P is a quantity of priorities supported on a sidelink, and D is a quantity of collision index intervals included in a third collision index interval group. The third collision index interval group is a collision index interval group to which the collision index interval belongs. The preset priority is one of priorities supported on the sidelink. The first priority corresponding to the first SCI is one of priorities supported on the sidelink.

With reference to the first aspect, in some implementations of the first aspect, the second threshold is an $L^{th}$ threshold in the RSRP threshold list to which the second threshold belongs.

Herein, $L=prio_{RX}+(prio_{TX}-1)\cdot P+d\cdot P\cdot P$.

Herein, $prio_{RX}$ is the first priority corresponding to the first SCI, $prio_{TX}$ is the preset priority, d is an interval index of a collision index interval corresponding to the collision index in the third collision index interval group, and $d\in[0,D-1]$.

With reference to the first aspect, in some implementations of the first aspect, that the third collision sub-index is determined based on the quantity of times that the $i^{th}$ periodic resource collides with the second reserved resource in the first window includes that the third collision sub-index is determined based on a quantity of resources that are located in the first window in the $i^{th}$ periodic resource, and the quantity of times that the $i^{th}$ periodic resource collides with the second reserved resource in the first window. That the fourth collision sub-index is determined based on the quantity of times that the $i^{th}$ periodic resource collides with the second reserved resource in the first window includes that the fourth collision sub-index is determined based on a quantity of resources that are located in the first window in the second reserved resource, and the quantity of times that the $i^{th}$ periodic resource collides with the second reserved resource in the first window.

With reference to the first aspect, in some implementations of the first aspect, the third collision sub-index, the quantity of resources that are located in the first window in the $i^{th}$ periodic resource, and the quantity of times that the $i^{th}$ periodic resource collides with the second reserved resource in the first window satisfy the following formula:

$$c=B/N3.$$

Herein, C is the third collision sub-index, N3 is the quantity of resources that are located in the first window in the $i^{th}$ periodic resource, and B is the quantity of times that the $i^{th}$ periodic resource collides with the second reserved resource in the first window.

The fourth collision sub-index, the quantity of resources that are located in the first window in the second reserved resource, and the quantity of times that the $i^{th}$ periodic resource collides with the second reserved resource in the first window satisfy the following formula:

$$d=B/N4.$$

Herein, d is the fourth collision sub-index, N4 is the quantity of resources that are located in the first window in the second reserved resource, and B is the quantity of times that the $i^{th}$ periodic resource collides with the second reserved resource in the first window.

With reference to the first aspect, in some implementations of the first aspect, the method further includes: when a quantity of resources included in the candidate available resource set is less than or equal to Y·M, enhancing a threshold in the RSRP threshold list to which the second threshold belongs; or when a quantity of resources included in the candidate available resource set is less than Y·M, enhancing a threshold in the RSRP threshold list to which the second threshold belongs, where Y is a preconfigured positive number less than 1.

Based on this implementation, after the threshold in the RSRP threshold list is enhanced, resource selection may be performed again until the quantity of resources included in the candidate available resource set is greater than or equal to Y·M, to ensure that the candidate available resource set has sufficient available resources.

With reference to the first aspect, in some implementations of the first aspect, the method further includes: sending second SCI. The second SCI includes first indication information. The first indication information indicates a second resource. The second resource is a resource released in a first periodic reserved resource. The first periodic reserved resource is a reserved resource indicated by the second SCI.

Based on this implementation, the first terminal device can indicate, in the SCI, the second resource to be released by the first terminal device. After another terminal device receives the SCI, if the reserved resource of the another terminal device includes the second resource, because the first terminal device is to release the second resource, the another terminal device may sense that sending data on the second resource does not collide with the first terminal device, and send data on the second resource, thereby improving resource utilization.

With reference to the first aspect, in some implementations of the first aspect, the SCI received in the sensing window includes third SCI. The third SCI indicates a third reserved resource. The second resource belongs to a first partial resource in the first periodic reserved resource. The first partial resource partially or completely overlaps the third reserved resource.

With reference to the first aspect, in some implementations of the first aspect, the first indication information includes a first field. The first field carries a second value V. The second resource is a $(V+1)^{th}$ resource after the second SCI in the first periodic reserved resource.

With reference to the first aspect, in some implementations of the first aspect, an RSRP associated with the third SCI is greater than a preset third threshold.

According to a second aspect, a resource selection method is provided. The method may be performed by a first terminal device; or may be performed by a component of a first terminal device, for example, a processor, a chip, or a chip system of the first terminal device; or may be implemented by a logical module or software that can implement all or some functions of a first terminal device. The method includes: generating and sending fifth sidelink control information SCI. The fifth SCI includes fourth indication information. The fourth indication information indicates a fifth resource. The fifth resource is a resource released in a third periodic reserved resource. The third periodic reserved resource is a reserved resource indicated by the fifth SCI.

Based on this solution, the first terminal device can indicate, in the SCI, the fifth resource to be released by the first terminal device. After another terminal device receives the SCI, if a reserved resource of the another terminal device includes the fifth resource, because the first terminal device is to release the fifth resource, the another terminal device may sense that sending data on the fifth resource does not collide with the first terminal device, and send the data on the fifth resource, thereby improving resource utilization.

With reference to the second aspect, in some implementations of the second aspect, the method further includes: receiving fourth SCI in a sensing window. The fourth SCI indicates a fourth reserved resource. The fifth resource belongs to a first partial resource of the third period reserved resource. The first partial resource partially or completely overlaps the fourth reserved resource.

With reference to the second aspect, in some implementations of the second aspect, the indication information includes a second field. The second field carries a third value V'. The fifth resource is a $(V'+1)^{th}$ resource after the fifth SCI in the third periodic reserved resource.

With reference to the second aspect, in some implementations of the second aspect, an RSRP associated with the fourth SCI is greater than a preset fourth threshold.

According to a third aspect, a communication apparatus is provided, to implement the foregoing method. The communication apparatus may be the first terminal device in the first aspect or the second aspect, or an apparatus including the first terminal device, or an apparatus included in the first terminal device, for example, a chip. The communication apparatus includes a corresponding module, unit, or means for implementing the foregoing method. The module, unit, or means may be implemented by hardware, software, or hardware executing corresponding software. The hardware or the software includes one or more modules or units corresponding to the foregoing functions.

In some possible designs, the communication apparatus may include a processing module, and may further include a transceiver module. The transceiver module may also be referred to as a transceiver unit, and is configured to implement a sending function and/or a receiving function in any one of the foregoing aspects and any one of the possible implementations of the foregoing aspects. The transceiver module may include a transceiver circuit, a transceiver machine, a transceiver, or a communication interface. The processing module may be configured to implement a processing function in any one of the foregoing aspects and any one of the possible implementations of the foregoing aspects.

In some possible designs, the transceiver module includes a sending module and a receiving module that are configured to respectively implement a sending function and a receiving function in any one of the foregoing aspects and any one of the possible implementations of the foregoing aspects.

According to a fourth aspect, a communication apparatus is provided. The apparatus includes a processor and a memory. The memory is configured to store computer instructions. When the processor executes the instructions, the communication apparatus is enabled to perform the method in any one of the foregoing aspects. The communication apparatus may be the first terminal device in the first aspect or the second aspect, or an apparatus including the first terminal device, or an apparatus included in the first terminal device, for example, a chip.

According to a fifth aspect, a communication apparatus is provided, including a processor and a communication interface. The communication interface is configured to communicate with a module outside the communication apparatus. The processor is configured to execute a computer program or instructions, so that the communication apparatus performs the method in any one of the foregoing aspects. The communication apparatus may be the first terminal device in the first aspect or the second aspect, or an apparatus including the first terminal device, or an apparatus included in the first terminal device, for example, a chip.

According to a sixth aspect, a communication apparatus is provided, including at least one processor. The processor is configured to execute a computer program or instructions stored in a memory, so that the communication apparatus performs the method in any one of the foregoing aspects. The memory may be coupled to the processor, or may be independent of the processor. The communication apparatus may be the first terminal device in the first aspect or the second aspect, or an apparatus including the first terminal device, or an apparatus included in the first terminal device, for example, a chip.

According to a seventh aspect, a computer-readable storage medium is provided. The computer-readable storage medium stores computer programs or instructions. When the computer programs or the instructions are executed on a communication apparatus, the communication apparatus is enabled to perform the method in any one of the foregoing aspects.

According to an eighth aspect, a computer program product including instructions is provided. When the computer program product is run on a communication apparatus, the communication apparatus is enabled to perform the method in any one of the foregoing aspects.

According to a ninth aspect, a communication apparatus is provided (for example, the communication apparatus may be a chip or a chip system). The communication apparatus includes a processor, configured to implement the function in any one of the foregoing aspects.

In some possible designs, the communication apparatus further includes a memory. The memory is configured to store necessary program instructions and data.

In some possible designs, when the apparatus is a chip system, the apparatus may include a chip, or may include a chip and another discrete device.

It may be understood that when the communication apparatus provided in any one of the third aspect to the ninth aspect is a chip, the sending action/function may be understood as outputting information.

For the technical effect brought by any design of the third aspect to the ninth aspect, refer to the technical effect brought by different designs of the first aspect or the second aspect. Details are not described herein again.

According to a tenth aspect, a communication system is provided. The communication system includes the first terminal device in the foregoing aspects.

According to an eleventh aspect, a communication apparatus is provided, including a unit configured to perform the method in any embodiment of this application.

BRIEF DESCRIPTION OF THE DRAWINGS

FIG. 3 is a schematic diagram of a structure of a communication apparatus according to an embodiment of this application;

FIG. 4 is a schematic flowchart of a resource selection method according to an embodiment of this application;

FIG. 4*b* is a schematic diagram of a periodic resource according to an embodiment of this application;

DETAILED DESCRIPTION OF ILLUSTRATIVE EMBODIMENTS

Figure 1:
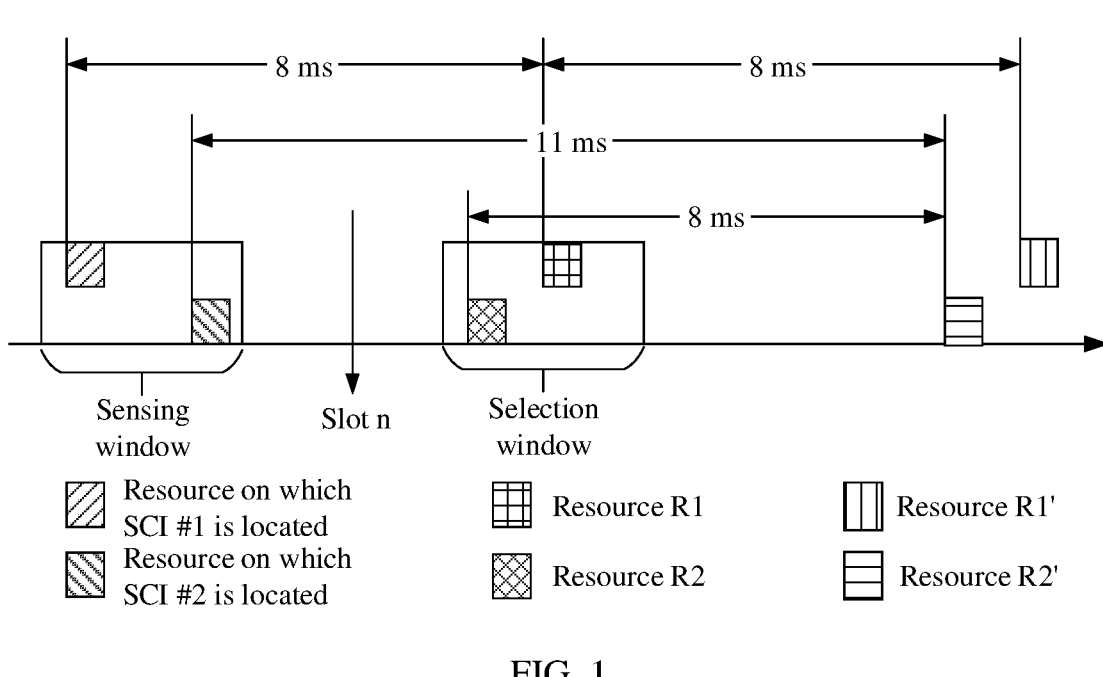
FIG. 1 is a schematic diagram of resource overlapping according to an embodiment of this application.

In the description of this application, "/" represents an "or" relationship between associated objects unless otherwise specified. For example, A/B may represent A or B. In this application, "and/or" describes only an association relationship for describing associated objects and represents that three relationships may exist. For example, A and/or B may represent the following three cases: Only A exists, both A and B exist, and only B exists, where A and B may be singular or plural.

In the description of this application, unless otherwise specified, "a plurality of" means two or more than two. "At least one of the following items (pieces)" or a similar expression thereof means any combination of these items, including any combination of singular or plural items (pieces). For example, at least one item (piece) of a, b, or c may indicate: a, b, c, a and b, a and c, b and c, or a, b, and c, where a, b, and c may be singular or plural.

In addition, to clearly describe the technical solutions in embodiments of this application, terms such as "first" and "second" are used in embodiments of this application to distinguish between same items or similar items that provide basically same functions or purposes. A person skilled in the art may understand that the words such as "first" and "second" do not limit a quantity or an execution sequence, and the words such as "first" and "second" do not indicate a definite difference. In addition, in embodiments of this application, the word such as "example" or "for example" represents giving an example, an illustration, or description. Any embodiment or design scheme described by using "example" or "for example" in embodiments of this application should not be construed as being more preferred or advantageous than another embodiment or design scheme. Exactly, use of the term such as "example" or "for example" is intended to present a relative concept in a specific manner for ease of understanding.

It may be understood that "an embodiment" mentioned in the entire specification means that particular features, structures, or characteristics related to the embodiment are included in at least one embodiment of this application. Therefore, embodiments in the entire specification do not necessarily indicate a same embodiment. In addition, these particular features, structures, or characteristics may be combined in one or more embodiments in any appropriate manner. It may be understood that sequence numbers of the foregoing processes do not mean execution sequences in various embodiments of this application. The execution sequences of the processes should be determined based on functions and internal logic of the processes, and should not be construed as any limitation on implementation processes of embodiments of this application.

It may be understood that, in this application, "when" and "if" mean that corresponding processing is performed in an objective situation, are not intended to limit time, do not require a determining action during implementation, and do not mean any other limitation.

It may be understood that "predefine" in this application may be understood as define, define in advance, store, pre-store, pre-negotiate, pre-configure, build into, or pre-burn.

It may be understood that, in some scenarios, some optional features in embodiments of this application may be independently implemented without depending on other features, for example, a solution on which the optional features are currently based, to resolve a corresponding technical problem and achieve corresponding effect. Alternatively, in some scenarios, some optional features are combined with other features according to a requirement. Correspondingly, an apparatus provided in embodiments of this application may also correspondingly implement these features or functions. Details are not described herein.

In this application, unless otherwise specified, for same or similar parts of embodiments, refer to each other. In embodiments of this application and the implementations/manners/implementation methods in embodiments, if there is no specific description and no logical conflict, terms and/or descriptions are consistent and can be mutually referenced between different embodiments and between the implementations/manners/implementation methods in embodiments. Technical features in different embodiments and the implementations/manners/implementation methods in embodiments may be combined to form a new embodiment, implementation, manner, or implementation method based on an internal logical relationship of the technical features. The following implementations of this application are not intended to limit the protection scope of this application.

In Mode 1 defined in 3GPP R16, a sending terminal in coverage of an access network device (for example, a base station) applies, to an access network device by using scheduling request signaling, for an SL resource for data transmission. The access network device then allocates a time-frequency resource to the sending terminal and a receiving terminal corresponding to the sending terminal, so that the sending terminal and the receiving terminal perform data transmission. Alternatively, the access network device directly configures, for the sending terminal by using radio resource control (RRC) signaling and/or physical layer signaling, an SL resource used for data transmission.

In other words, in Mode 1, the access network device performs centralized resource scheduling on the SL resource, to effectively avoid signal interference and resource conflict problems on an SL. However, Mode 1 heavily depends on the access network device. In addition, in a process of applying to the access network device for the SL resource, the sending terminal needs to perform signaling interaction with the access network device for a plurality of times. Consequently, a resource application time is relatively long. Therefore, for some SL scenarios in which no access network device exists or SL scenarios (for example, the internet of vehicles) in which a latency requirement is relatively high, Mode 1 is not applicable.

In Mode 2, a resource used for SL transmission is determined by the sending terminal through channel sensing and selection. Specifically, before sending information, each sending terminal using Mode 2 first sends first sidelink control information (sidelink control information 1, SCI 1) on a physical sidelink control channel (PSCCH), and sends second sidelink control information (sidelink control information 2, SCI 2) on a physical sidelink shared channel (PSSCH).

The SCI 2 indicates an identifier of a terminal sending the SCI 1 and the SCI 2, and the like. The SCI 1 indicates a reserved time-frequency resource location of the terminal. In a periodic service scenario, the reserved time-frequency resource location indicated by the SCI 1 includes two parts. A first part is a time-frequency resource location used to transmit a current data packet, and includes a time-frequency resource location used for initial transmission and retransmission of the data packet. A second part is a periodic resource reserved for a periodic service. For example, the SCI 1 may indicate a period. The periodic resource reserved for the periodic service is a resource obtained after the resource used to transmit the current data packet is extended based on the period indicated by the SCI 1 in time domain. Generally, a minimum time granularity of a reserved resource of the terminal on the SL is a slot, and a minimum frequency granularity is a sub-channel. In addition, the SCI 1 may further indicate a priority. The priority may be understood as a priority of a data packet (or a service).

It should be noted that, in the following embodiments of this application, unless otherwise specified, the SCI may implement a function of the SCI 1, or the SCI may be understood as the SCI 1.

When a terminal A is in an idle state, the terminal A may blindly detect SCI sent by another terminal, to learn of a reserved resource of the another terminal. When the terminal A has to-be-sent data, the terminal A may determine, from a selection window based on the SCI that is of the another terminal and that is received by the terminal A in a sensing window, an available resource for transmitting a single data packet or a periodic service data packet.

The selection window is referred to as a selecting window for short, and the selection window and the selecting window may also be replaced with each other.

For example, when the terminal A has a periodic service to be transmitted, or has a periodic service data packet to be transmitted, resource selection may be performed according to the following procedure. It is assumed that the terminal A triggers resource selection in a slot n. The procedure may specifically include the following steps.

Step 1: Obtain related parameters of this time of resource selection from a higher layer. The parameters include: a priority $prio_{TX}$, a remaining packet delay budget (PDB), a quantity $L_{subCH}$ of sub-channels that are needed for transmitting a single data packet in a slot, and a resource reservation period $P_{rsvp\_TX}$ (in a unit of a millisecond (ms)). The priority may be understood as a priority of a to-be-transmitted service. The resource reservation period may be understood as a period of the to-be-transmitted service. In addition, during resource selection, the resource reservation period needs to be converted into a period $P'_{rsvp\_TX}$ in a unit of a slot.

Step 2: Obtain resource pool information, parameter sl-SelectionWindowList, parameter sl-ThresPSSCH-RSRP-List, parameter sl-RS-ForSensing, parameter sl-ResourceReservePeriodList, and parameter sl-Sensing Window for resource selection from the upper layer.

sl-SelectionWindowList is used to determine an end location of the selection window.

sl-ThresPSSCH-RSRP-List is used to determine reference signal received power (RSRP) decision thresholds in different priority combinations. The priority combination is a combination of the priority $prio_{TX}$ obtained from the higher layer in step 1 and a priority indicated by SCI of another device.

sl-RS-ForSensing is used to determine whether to use an RSRP corresponding to a PSSCH as a decision basis or an RSRP of a PSCCH as a decision basis.

Optionally, the RSRP corresponding to the PSSCH may also be understood as an RSRP corresponding to a data channel associated with the SCI 1, and the RSRP of the PSCCH may also be understood as an RSRP of the SCI 1.

sl-ResourceReservePeriodList is used to determine a period value supported by an SL resource pool.

sl-Sensing Window is used to determine a start location of the sensing window.

In addition, for ease of description, the resource pool used for resource selection is referred to as an SL resource pool in the following embodiments of this application. This is uniformly described herein. Details are not described in the following embodiments again.

Step 3: Determine an initial candidate single slot resource set $S_A$.

The initial candidate single slot resource set $S_A$ includes all candidate single slot resources in the selection window in the SL resource pool. A range of the selection window is a slot $[n+T_1, n+T_2]$. Herein, $T_1$ is determined based on a capability of the terminal, and $T_2$ is determined based on parameter sl-SelectionWindowList and the PDB. A quantity of candidate single slot resources included in the initial candidate single slot resource set $S_A$ is denoted as $M_{total}$.

One candidate single slot resource $R_{x,y}$ is defined as $L_{subCH}$ consecutive sub-channels starting from a sub-channel x in a slot $$t_y^{SL}.$$

Step 4: Listen to the SCI of the another terminal in a slot that is included in the SL resource pool and that is located in the sensing window.

It may be understood that, in the sensing window, the terminal A sends data, and the terminal A further needs to continuously listen to the SCI of the another terminal.

A range of the sensing window is a slot $$[n - T_0, n - T_{proc,0}^{SL}].$$

Herein, $T_0$ is determined based on parameter sl Sensing Window, and $$T_{proc,0}^{SL}$$

is determined based on subcarrier spacing used by the SL resource pool.

Step 5: When a candidate single slot resource $R_{x,y}$ in the initial candidate single slot resource set $S_A$ meets the following condition, exclude the candidate single slot resource from the $S_A$.

(a) The terminal A does not perform channel listening in the slot $$t_m^{\prime SL}.$$

Herein, $$t_m^{\prime SL}$$

is a slot in the sensing window.

(b) For any period value P configured based on parameter sl-ResourceReservePeriodList, it is assumed that the terminal A receives SCI in a slot $$t_m^{\prime SL},$$

a resource reservation period indicated by the SCI is P, and a periodic resource obtained after the slot $$t_m^{\prime SL}$$

is extended based on the resource reservation period P partially or completely overlaps the candidate single slot resource $R_{x,y}$ or a resource obtained after the candidate single slot resource $R_{x,y}$ is extended based on the period $$P_{rsvp\_TX}^{\prime}.$$

In other words, a resource on a slot $$t_{m+q\times P}^{\prime SL}$$

overlaps $$R_{x,y+j\times P_{rsvp\_TX}^{\prime}}.$$

Herein, q=1, 2, . . . , Q, and j=0, 1, . . . , $C_{resel}$−1.

It should be noted that, in this application, a subscript of a slot indicates an index of the slot. For example, a subscript m in $$t_m^{\prime SL}$$

indicates that a slot index is m, and a subscript in $$t_{m+q\times P}^{\prime SL}$$

indicates that a slot index is m+q×P.

Step 6: When the candidate single slot resource $R_{x,y}$ in the initial candidate single slot resource set $S_A$ meets all of the following three conditions, exclude the candidate single slot resource from $S_A$.

(a) A resource reservation period indicated by the SCI received by the terminal A in the slot $$t_m^{\prime SL}$$

is $P_{rsvp\_RX}$ (in a unit of ms), and is converted to a period $$P_{rsvp\_RX}^{\prime}$$

in a unit of a slot; and a priority indicated by the SCI is $prio_{RX}$.

(b) An RSRP that is associated with the SCI received by the terminal A in the slot $$t_m^{\prime SL}$$

is greater than a threshold $Th(prio_{RX}, prio_{TX})$, and the threshold is determined based on parameter sl-ThresPSSCH-RSRP-List. Whether the RSRP that is associated with the SCI is the RSRP of the PSCCH or the RSRP of the PSSCH corresponding to the SCI is determined based on parameter sl-RS-ForSensing.

(c) The periodic resource obtained after the resource on which the SCI is located is extended based on the period $$P_{rsvp\_RX}^{\prime}$$

partially or completely overlaps the candidate single slot resource or the resource obtained after the candidate single slot resource is extended based on the period $$P_{rsvp\_TX}^{\prime}.$$

In other words, the resource in the slot $$t_{m+q\times P_{rsvp\_RX}^{\prime}}^{\prime SL}$$

overlaps $R_{x,y+j\times P_{rsvp\_TX}^{\prime}}$. Herein, q=1,2, . . . , Q, j=0,1, . . . , $C_{resel}$−1, q=1, 2, . . . , Q indicates that q is a positive integer from 1 to Q, and j=0,1, . . . , $C_{resel}$−1 indicates that j is a positive integer from 0 to $C_{resel}$−1.

It should be noted that the terminal device may send the SCI and the data in a same slot. For example, if one time-frequency resource includes one slot in time domain, the terminal device may send the SCI on some frequency domain resource blocks (resource block, RB) on first several symbols in the slot, and send the data on remaining resources. Therefore, the resource on which the SCI is located in this application may be a resource used to send the SCI and the data.

It may be understood that step 5 may be understood as related implementation when the terminal A does not perform channel listening in the slot $$t_m^{\prime SL}$$

in the sensing window, and step 6 may be understood as related implementation when the terminal A receives the SCI in the slot $$t_m^{\prime SL}$$

in the sensing window.

Step 7: If a quantity of remaining candidate single slot resources in the initial candidate single slot resource set $S_A$ is less than $X \cdot M_{total}$, enhance each RSRP threshold in the threshold $Th(prio_{RX}, prio_{TX})$ by 3 dB, and return to step 4 to continue to perform the procedure; or if a quantity of remaining candidate single slot resources in $S_A$ is greater than $X \cdot M_{total}$, report $S_A$ to the higher layer. Herein, X is a number that is greater than 0 and less than 1 and that is configured by the higher layer.

For example, as shown in FIG. 1, the terminal A triggers the resource selection process in the slot n, and determines a periodic resource with a period of 8 ms for a logical channel with a priority of $prio_{TX}$ at a medium access control (medium access control, MAC) layer. It is assumed that the terminal A receives, in the sensing window, SCI #1 sent by a terminal B and SCI #2 sent by a terminal C, a reservation period indicated by SCI #1 is 8 ms, and a reservation period indicated by SCI #2 is 11 ms. In this case, a reserved resource indicated by SCI #1 collides with a resource R1 in the selection window. When an RSRP associated with SCI #1 is greater than the threshold $Th(prio_B, prio_{TX})$ related to the priority combination, the terminal A excludes the resource R1 from the initial candidate single slot resource set. Herein, $prio_B$ is a priority indicated by SCI #1.

In addition, a reserved resource indicated by SCI #2 collides with a resource $$R_2^{\prime}.$$

The resource $$R_2^{\prime}$$

is a resource obtained after a resource R2 in the selection window is extended based on a period (8 ms) of a to-be-transmitted service of the terminal A. When an RSRP associated with SCI #2 is greater than the threshold $Th(prio_C, prio_{TX})$ related to the priority combination, the terminal A excludes the resource R2 from the initial candidate single slot resource set. Herein, $prio_C$ is a priority indicated by SCI #2.

In the foregoing resource selection process, when step 6 is performed, a reserved resource of another terminal in the slot $$t_{m+q \times P_{rsvp\_RX}^{\prime}}^{SL}$$

is determined based on the received SCI of the another terminal. Herein, q1,2, . . . , Q. A larger value of Q indicates more collision locations between the reserved resource of the another terminal and a to-be-reserved resource of the terminal and more resources to be excluded by the terminal from the initial candidate single slot resource set. Therefore, available resources become fewer.

To ensure a specific quantity of available resources, currently, a value of Q is usually limited to 1 or $$Q = \lceil T_2 / P_{rsvp\_RX}^{\prime} \rceil.$$

Because the end location of the selection window is a slot $n+T_2$, for the slot $$t_{m+q \times P_{rsvp\_RX}^{\prime}}^{SL},$$

when q takes the maximum value Q and $$Q = \lceil T_2 / P_{rsvp\_RX}^{\prime} \rceil,$$

$$Q \times P_{rsvp\_RX}^{\prime}$$

is less than $T_2$. Because the slot m is a slot in the sensing window, that is, the slot m is later than the slot n, $$Q = \lceil T_2 / P_{rsvp\_RX}^{\prime} \rceil$$

indicates that periodic extension of a resource in which the SCI received in the slot m is located does not exceed the selection window. However, this solution may cause frequent collisions between a reserved periodic resource of the terminal and a reserved periodic resource of another terminal after the selection window, thereby causing subsequent frequent resource reselection processes.

Especially, in a periodic service scenario, periodic services of different terminals may have a same period. In this case, in the foregoing resource selection process, the terminal may select a reserved periodic resource that is of the another terminal and that frequently collides with the reserved periodic resource of the terminal.

For example, based on the example shown in FIG. 1, both the resource R1 and the resource R2 selected in the selection window collide with the reserved periodic resource of the another terminal. It is assumed that interference to another resource in the selection window is also very severe, and the terminal A continuously enhances the RSRP threshold. Finally, the resource R1 may be selected because the RSRP associated with SCI #1 of the terminal B is relatively small. However, because periods of the terminal B and the terminal A are the same, a collision occurs once every 8 ms if the resource R1 is selected. If the terminal A selects the resource R2, because the period of the terminal C is 11 ms, and the period of the terminal A is 8 ms, a collision occurs once every 88 ms subsequently. Therefore, frequency of resource collision may be reduced if the resource R2 is selected.

In conclusion, in the existing resource selection process, for a periodic service, a reserved periodic resource of a terminal may frequently collide with a reserved periodic resource of another terminal. On this basis, this application provides a resource selection method, to reduce a collision between reserved resources of terminals, thereby improving communication efficiency.

The technical solutions in embodiments of this application may be applied to various communication systems. The communication system may be a 3rd generation partnership project (3GPP) communication system, for example, a long term evolution (LTE) system, a 5th generation (5G) mobile communication system, an vehicle to everything (V2X) system, an LTE and 5G hybrid networking system, a device-to-device (D2D) system, a machine to machine (M2M) system, an internet of things (IoT), wireless fidelity (Wi-Fi), a worldwide interoperability for microwave access (WiMAX) system, or another next-generation communication system. Alternatively, the communication system may be a non-3GPP communication system. This is not limited.

The technical solutions in embodiments of this application may be applied to various communication scenarios, for example, may be applied to one or more of the following communication scenarios: enhanced mobile broadband (eMBB), ultra-reliable and low latency communication (URLLC), machine-type communication (MTC), massive machine-type communication (mMTC), D2D, V2X, and IoT.

The communication system and the communication scenarios applicable to this application are merely examples for description. The communication system and the communication scenarios applicable to this application are not limited thereto. This is uniformly described herein. Details are not described below again.

Figure 2:
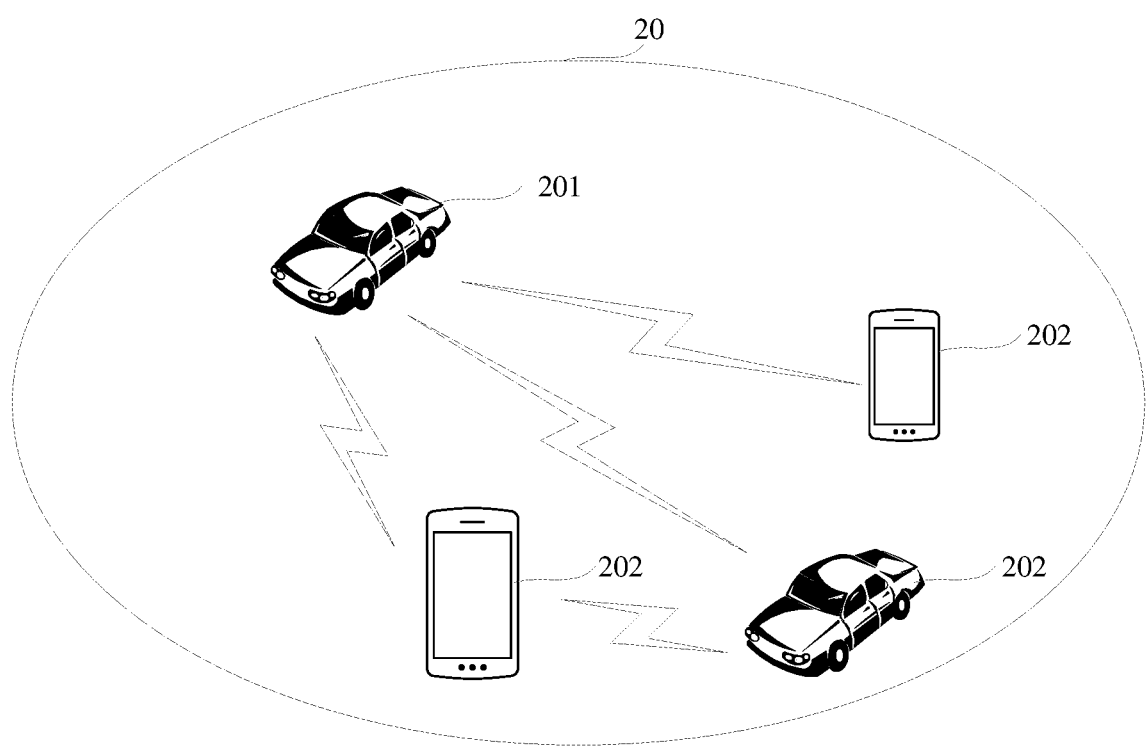
FIG. 2 is a schematic diagram of a structure of a communication system according to an embodiment of this application.

FIG. 2 shows a communication system according to an embodiment of this application. The communication system includes a first terminal device 201 and at least one second terminal device 202. Optionally, between the first terminal device 201 and the second terminal device 202, a second terminal device 202 and another second terminal device 202 may communicate with each other through an SL.

Optionally, the terminal device in this embodiment of this application may be a device configured to implement a communication function. The terminal device may also be referred to as user equipment (UE), a terminal, an access terminal, a subscriber unit, a subscriber station, a mobile station (MS), a remote station, a remote terminal, a mobile terminal (MT), a user terminal, a wireless communication device, a user agent, a user apparatus, or the like. The terminal device may be, for example, a wireless terminal or a wired terminal in IoT, V2X, D2D, M2M, a 5G network, or a future evolved public land mobile network (PLMN). The wireless terminal may be a device with wireless receiving and transmitting functions. The wireless terminal may be deployed on land, and includes an indoor device or an outdoor device, a hand-held device, or a vehicle-mounted device. Alternatively, the wireless terminal may be deployed on water (for example, a ship). Alternatively, the wireless terminal may be deployed in air (for example, an airplane, a balloon, or a satellite).

For example, the terminal device may be an IoT device (for example, a sensor, an electricity meter, or a water meter), a V2X device, a station (STA) in a wireless local area network (WLAN), a cellular phone, a cordless phone, a session initiation protocol (SIP) phone, a wireless local loop (WLL) station, a personal digital assistant (PDA) device, a hand-held device with a wireless communication function, a computing device or another processing device connected to a wireless modem, a vehicle-mounted device, a wearable device (which may also be referred to as a wearable intelligent device), a tablet computer or a computer with wireless receiving and transmitting functions, a virtual reality (VR) terminal, a wireless terminal in industrial control, a wireless terminal in self driving, a wireless terminal in remote medical, a wireless terminal in a smart grid, a wireless terminal in transportation safety, a wireless terminal in a smart city, a wireless terminal in a smart home, a vehicle-mounted terminal, a vehicle having a vehicle-to-vehicle (V2V) communication capability, an intelligent networked vehicle, an unmanned aerial vehicle having an unmanned aerial vehicle to unmanned aerial vehicle (UAV to UAV, U2U) communication capability, and the like. The terminal may be mobile or fixed. This is not specifically limited in this application.

Optionally, the first terminal device 201 in this embodiment of this application may also be referred to as communication apparatuses, and may be a general-purpose device or a dedicated device. This is not specifically limited in this embodiment of this application.

Optionally, in this embodiment of this application, the first terminal device 201 in FIG. 2 may be implemented by using a communication apparatus (or a communications apparatus) 30 in FIG. 3. FIG. 3 is a schematic diagram of a structure of a communication apparatus 30 according to an embodiment of this application. The communication apparatus 30 includes one or more processors 301, a communication bus 302, and at least one communication interface (in FIG. 3, an example in which a communication interface 304 and one processor 301 are included is only used for description). Optionally, the communication apparatus 30 may further include a memory 303.

The processor 301 may be a general-purpose central processing unit (CPU), a microprocessor, an application-specific integrated circuit (ASIC), or one or more integrated circuits configured to control execution of a program in the solutions in this application.

The communication bus 302 may be a peripheral component interconnect (PCI) bus, an extended industry standard architecture (EISA) bus, or the like. The bus may be classified into an address bus, a data bus, a control bus, or the like. For ease of representation, only one thick line is used to represent the bus in FIG. 3, but this does not indicate that there is only one bus or only one type of bus. The communication bus 302 is configured to connect different components in the communication apparatus 30, so that the different components can communicate with each other.

The communication interface 304 may be a transceiver module, configured to communicate with another device or a communication network. For example, the communication network may be, for example, the Ethernet, a radio access network (RAN), or a wireless local area network (WLAN). For example, the transceiver module may be an apparatus such as a transceiver. Optionally, the communication interface 304 may be alternatively a transceiver circuit located inside the processor 301, and is configured to implement signal input and signal output of the processor.

The memory 303 may be an apparatus having a storage function. The memory 303 may be, for example, a read-only memory (ROM) or another type of static storage device that can store static information and instructions, or a random access memory (RAM) or another type of dynamic storage device that can store information and instructions; or may be an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray disc, and the like), a magnetic disk storage medium or another magnetic storage device, or any other medium that can carry or store expected program code in a form of an instruction or a data structure and that can be accessed by a computer. However, this is not limited thereto. The memory may exist independently, and is connected to the processor through the communication bus 302. Alternatively, the memory may be integrated with the processor.

The memory 303 is configured to store computer-executable instructions for executing the solutions of this application, and the processor 301 controls the execution. The processor 301 is configured to execute the computer-executable instructions stored in the memory 303, to implement the method provided in embodiments of this application.

Alternatively, optionally, in this embodiment of this application, the processor 301 may perform functions related to processing in the method provided in the following embodiment in this application, and the communication interface 304 is responsible for communication with another device or a communication network. This is not specifically limited in this embodiment of this application.

Optionally, the computer-executable instructions in this embodiment of this application may also be referred to as application program code. This is not specifically limited in this embodiment of this application.

In specific implementation, in an embodiment, the processor 301 may include one or more CPUs, for example, a CPU 0 and a CPU 1 in FIG. 3.

In specific implementation, in an embodiment, the communication apparatus 30 may include a plurality of processors, for example, the processor 301 and a processor 308 in FIG. 3. Each of these processors may be a single-core (single-CPU) processor or a multi-core (multi-CPU) processor. The processor herein may be one or more devices, circuits, and/or processing cores configured to process data (for example, computer program instructions).

In specific implementation, in an embodiment, the communication apparatus 30 may further include an output device 305 and an input device 306. The output device 305 communicates with the processor 301, and may display information in a plurality of manners. For example, the output device 305 may be a liquid crystal display (LCD), a light emitting diode (LED) display device, a cathode ray tube (CRT) display device, or a projector. The input device 306 communicates with the processor 301, and may receive input of a user in a plurality of manners. For example, the input device 306 may be a mouse, a keyboard, a touchscreen device, a sensor device, or the like.

It should be noted that the composition structure shown in FIG. 3 does not constitute limitation on the communication apparatus. In addition to the components shown in FIG. 3, the communication apparatus may include more or fewer components than those shown in the figure, or combine some components, or have different component arrangements.

It should be noted that, in the following embodiments of this application, names of parameters, names of information, or the like are merely examples, and may be other names in another embodiment. The method provided in this application imposes no specific limitation thereto.

It may be understood that in embodiments of this application, a device may perform some or all of the steps in embodiments of this application, and these steps or operations are merely examples. In embodiments of this application, another operation or various operation variants may further be performed. In addition, the steps may be performed in different sequences presented in embodiments of this application, and not all the operations in embodiments of this application need to be performed.

FIG. 4*a* is a flowchart of a resource selection method according to an embodiment of this application. The method may be applied to the first terminal device in the communication system shown in FIG. 2. As shown in FIG. 4*a*, the resource selection method may include the following steps:

S401: The first terminal device determines an initial candidate resource set.

The initial candidate resource set includes M resources. Herein, M is a positive integer. For example, in this embodiment of this application, a minimum time granularity of the resource may be an orthogonal frequency division multiplexing (OFDM) slot, a subframe, or a frame; and a minimum frequency granularity of the resource may be a sub-channel. For example, one resource may be L consecutive sub-channels starting from a sub-channel x in one slot.

Optionally, a resource included in the initial candidate resource set is a resource in a selection window in an SL resource pool. The first terminal device may obtain related parameters from a higher layer to determine the initial candidate resource set. For details, refer to the related description in step 1 to step 3. Details are not described herein again.

S402: The first terminal device determines, based on an RSRP and a collision index that are associated with SCI received in a sensing window, whether to exclude an $i^{th}$ resource in the M resources from the initial candidate resource set, to obtain a candidate available resource set. Herein, i is a positive integer from 1 to M.

Optionally, step S402 may be understood as that the first terminal device determines, based on the RSRP and the collision index that are associated with the SCI received in the sensing window, whether to determine the $i^{th}$ resource in the M resources as a resource in the candidate available resource set.

For example, when determining to exclude the $i^{th}$ resource from the initial candidate resource set, the first terminal device determines not to determine the $i^{th}$ resource as a resource in the candidate available resource set. When determining not to exclude the $i^{th}$ resource from the initial candidate resource set, the first terminal device determines to determine the $i^{th}$ resource as a resource in the candidate available resource set.

Optionally, the SCI received by the first terminal device in the sensing window may include X1 pieces of SCI. Herein, X1 is a positive integer greater than 1. An RSRP associated with any one of the X1 pieces of SCI may be an RSRP of a PSCCH on which the SCI is located, for example, an RSRP of a demodulation reference signal (DMRS) corresponding to the PSCCH on which the SCI is located. Alternatively, the RSRP associated with the SCI may be an RSRP of a data channel PSSCH scheduled by using the SCI, for example, an RSRP of a DMRS corresponding to the PSSCH.

The collision index is an index of a collision between a reserved resource indicated by the SCI received in the sensing window and an $i^{th}$ periodic resource. The $i^{th}$ periodic resource includes the $i^{th}$ resource and a resource obtained after the $i^{th}$ resource is extended based on a preset first period.

For example, as shown in FIG. 4b, the $i^{th}$ resource in the initial candidate resource set is a resource R1 shown in FIG. 4b. If the first period is 6 ms, the resource R1 is extended by one first period to obtain a resource R2, extended by two first periods to obtain a resource R3, extended by three first periods to obtain a resource R4, and extended by four first periods to obtain a resource R5. In this case, the $i^{th}$ periodic resource includes the resource R1, the resource R2, the resource R3, the resource R4, and the resource R5.

It should be noted that "the SCI received in the sensing window" may include one or more of the X1 pieces of SCI received in the sensing window, and "the reserved resource indicated by the SCI received in the sensing window" may include a reserved resource indicated by one or more of the X1 pieces of SCI received in the sensing window.

It may be understood that the periodic resource in this application is a periodic resource in time domain. To be specific, differences between time domain locations (for example, start time domain locations or end time domain locations) of any two adjacent resources in a same periodic resource are equal. Optionally, frequency domain locations of all resources in a same periodic resource are the same.

Optionally, a reserved resource indicated by any one of the X1 pieces of SCI received in the sensing window may be a periodic reserved resource. Optionally, the reserved resource may include a resource on which the SCI is located and a resource obtained after the resource on which the SCI is located is periodically extended based on the period indicated by the SCI.

Optionally, the first period may be a period preset by a higher layer. For example, the first period may be configured by a MAC layer for a first logical channel, and the first logical channel may be used to transmit a first service of the first terminal device. Therefore, the first period may also be understood as a period of the first service.

Optionally, that the reserved resource indicated by the SCI received in the sensing window collides with the $i^{th}$ periodic resource may include that the reserved resource indicated by the SCI received in the sensing window partially or completely overlaps the $i^{th}$ periodic resource.

Optionally, step S402 may be understood as a part of implementation of determining the candidate available resource set. In other words, in addition to step S402, the first terminal device may further perform another operation to determine the candidate available resource set. To be specific, the first terminal device may determine the candidate available resource set with reference to step S402 and another operation. This is described in a subsequent embodiment. Details are not described herein again.

Optionally, a resource in the candidate available resource set may be used by the first terminal device to send data. Further, the periodic resource obtained after the resource in the candidate available resource set is extended based on the first period may be used to periodically send data. To be specific, after step S402, the first terminal device may send the data by using the resource in the candidate available resource set, and further, may periodically send the data by using the periodic resource corresponding to the resource in the candidate available resource set.

Based on the foregoing solution, the first terminal device performs resource selection with reference to the RSRP associated with the SCI received in the sensing window and the index of the collision between the reserved resource indicated by the SCI and the periodic resource corresponding to the resource in the selection window. Therefore, a case in which the periodic resource corresponding to the resource in the selection window collides with a reserved resource of another terminal device can be more comprehensively evaluated, and a resource with fewer collisions is selected as much as possible, to reduce a collision between reserved resources of terminal devices and subsequent resource reselection, thereby improving communication efficiency.

The foregoing describes an overall procedure of the resource selection method provided in this application. The following describes specific implementation of step S402.

Optionally, this application provides the following two implementations. In a first implementation, the first terminal device may determine an evaluation index of a resource based on the RSRP and the collision index that are associated with the SCI received in the sensing window, and then determine, based on the evaluation index, whether to exclude the resource from the initial candidate resource set. In a second implementation, the first terminal device may determine, based on a value relationship between the RSRP associated with the SCI received in the sensing window and a threshold associated with the collision index, whether to exclude the resource from the initial candidate resource set.

For the first implementation:

Optionally, that the first terminal device determines, based on the RSRP and the collision index that are associated with the SCI received in the sensing window, whether to exclude the $i^{th}$ resource from the initial candidate resource set may include: determining, based on the RSRP associated with the SCI received in the sensing window, the collision index, a first priority corresponding to the SCI received in the sensing window, and a preset priority, whether to exclude the $i^{th}$ resource from the initial candidate resource set.

Optionally, a first priority corresponding to any one of the X1 pieces of SCI received in the sensing window may be a priority indicated by the SCI. The preset priority may be a priority preset by the higher layer. For example, the preset priority may be a priority configured by the MAC layer for the first logical channel. As described above, the first logical channel is used to transmit the first service of the first terminal device. Therefore, the first priority may also be understood as a priority of the first service.

Optionally, for the $i^{th}$ resource, the X1 pieces of SCI received in the sensing window may include X2 pieces of SCI associated with the $i^{th}$ resource. Herein, X2 is a positive integer less than or equal to X1. The X2 pieces of SCI may form X SCI sets associated with the $i^{th}$ resource. Herein, X is a positive integer. That the $i^{th}$ resource is associated with the X SCI sets may be understood as follows: A reserved resource indicated by SCI included in the X SCI sets partially or completely overlaps the $i^{th}$ periodic resource, or a reserved resource indicated by SCI included in the X SCI sets collides with or conflicts with the $i^{th}$ periodic resource.

Optionally, SCI included in a same SCI set in the X SCI sets corresponds to one or more pieces of information of a same first priority, a same period, a same time domain resource allocation indication, and a same frequency domain resource allocation indication. For example, the SCI in the same SCI set in the X SCI sets corresponds to a same first priority, a same period, a same time domain resource allocation indication, and a same frequency domain resource allocation indication. A time domain location of the reserved resource indicated by the SCI may be determined with reference to a time domain resource allocation indication and a time domain location of the resource on which the SCI is located, and a frequency domain location of the reserved resource indicated by the SCI may be determined based on a frequency domain resource allocation indication.

Optionally, a period, a time domain resource allocation indication, and a frequency domain resource allocation indication that correspond to the SCI may be a period, a time domain resource allocation indication, and a frequency domain resource allocation indication that are carried in the SCI or that are indicated by the SCI.

For example, the $i^{th}$ resource is associated with three SCI sets. In other words, X is equal to 3. Each SCI set includes two pieces of SCI. SCI #11 and SCI #12 included in an SCI set 1 correspond to a same first priority, a same period, a same time domain resource allocation indication, and a same frequency domain resource allocation indication. SCI #21 and SCI #22 included in an SCI set 2 correspond to a same first priority, a same period, a same time domain resource allocation indication, and a same frequency domain resource allocation indication. SCI #31 and SCI #32 included in an SCI set 3 correspond to a same first priority, a same period, a same time domain resource allocation indication, and a same frequency domain resource allocation indication.

In addition, reserved resources indicated by SCI included in a same SCI set in the X SCI sets partially or completely overlap.

Figure 5:
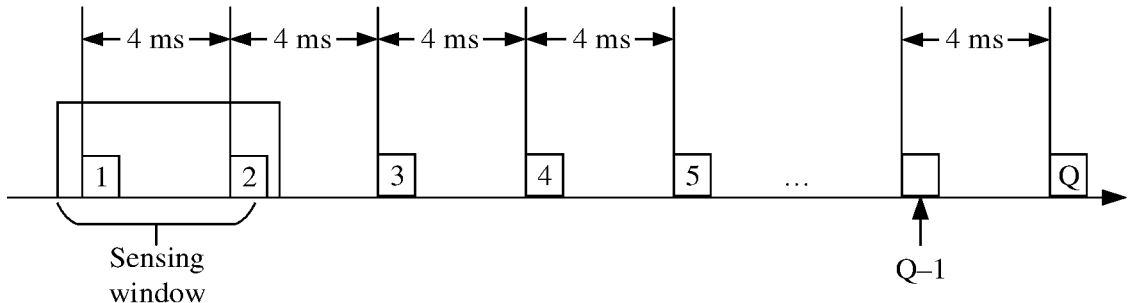
FIG. 5 is a schematic diagram of resource locations according to an embodiment of this application.

Optionally, a reason why the reserved resources indicated by the SCI included in the same SCI set partially overlap may be that the plurality of pieces of SCI are SCI corresponding to a plurality of data packets that are of a same periodic service and that are sent by a same device. For example, the SCI set 1 is used as an example. As shown in FIG. 5, it is assumed that SCI #11 and SCI #12 included in the SCI set 1 are SCI corresponding to a plurality of data packets that are of a same periodic service and that are sent by a second terminal device, and a period of the periodic service is 4 ms. If the first terminal device receives SCI #11 on a resource 1, the reserved resource indicated by SCI #11 includes a resource 1 and a resource (a resource 2, a resource 3, . . . , and a resource Q shown in FIG. 5) obtained after the resource 1 is extended based on 4 ms. If the first terminal device receives SCI #12 on the resource 2, the reserved resource indicated by SCI #12 includes the resource 2 and a resource (the resource 3, . . . , and the resource Q shown in FIG. 5) obtained after the resource 2 is extended based on 4 ms. In this case, the reserved resource indicated by SCI #11 partially overlaps the reserved resource indicated by SCI #12, and a non-overlapping part is the resource 1. The resource 3, . . . , and the resource Q represent the resource Q, the resource 3, and Q-3-1 resources between the resource Q and the resource 3, and an interval between adjacent resources is 4 ms.

Optionally, when the X2 pieces of SCI in the X1 pieces of SCI received in the sensing window form the X SCI sets associated with the $i^{th}$ resource, the collision index may include X collision indices, and the X collision indices are in a one-to-one correspondence with the X sets. For example, the SCI set 1 may correspond to a collision index 1, the SCI set 2 may correspond to a collision index 2, and the SCI set 3 may correspond to a collision index 3.

Figure 6:
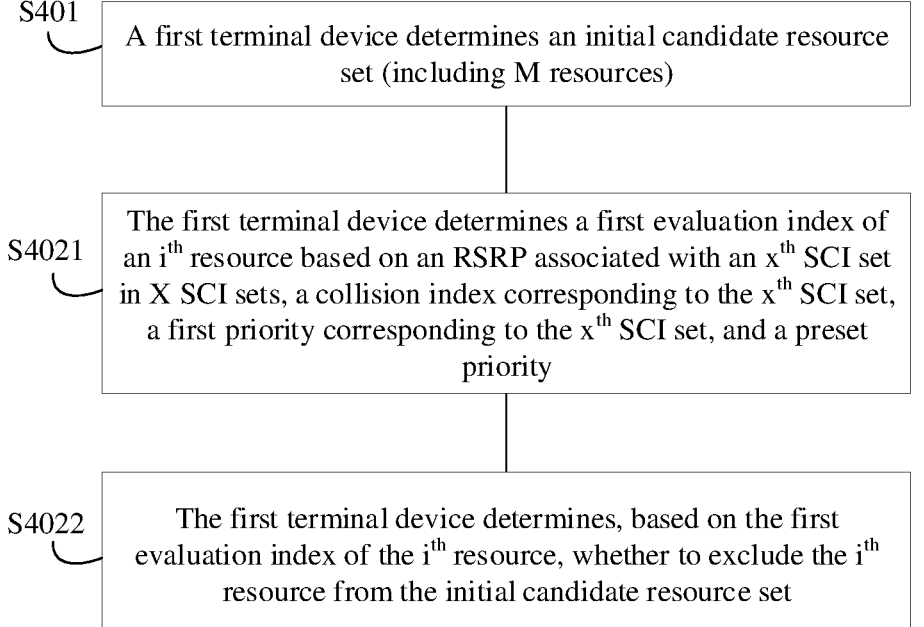
FIG. 6 is a schematic flowchart of another resource selection method according to an embodiment of this application.

Optionally, as shown in FIG. 6, when the X collision indices are in a one-to-one correspondence with the X sets, determining, based on the RSRP associated with the SCI received in the sensing window, the collision index, the first priority corresponding to the SCI received in the sensing window, and the preset priority, whether to exclude the $i^{th}$ resource from the initial candidate resource set may include the following steps:

S4021: Determine a first evaluation index of the $i^{th}$ resource based on an RSRP associated with an $x^{th}$ SCI set in the X SCI sets, a collision index corresponding to the $x^{th}$ SCI set, a first priority corresponding to the $x^{th}$ SCI set, and the preset priority. Herein, x is a positive integer from 1 to X. In a specific implementation process, the first evaluation index of the $i^{th}$ resource may also be determined based on one or more of the RSRP associated with the $x^{th}$ SCI set, the collision index corresponding to the $x^{th}$ SCI set, the first priority corresponding to the $x^{th}$ SCI set, and the preset priority. This is not limited in this embodiment of this application.

S4022: Determine, based on the first evaluation index of the $i^{th}$ resource, whether to exclude the $i^{th}$ resource from the initial candidate resource set.

Optionally, step S4022 may be understood as determining, based on the first evaluation index of the $i^{th}$ resource, whether to determine the $i^{th}$ resource as a resource in the candidate available resource set.

Optionally, the RSRP associated with the $x^{th}$ SCI set may be an average value of RSRPs associated with various pieces of SCI included in the $x^{th}$ SCI set, or a maximum or minimum RSRP in RSRPs associated with various pieces of SCI, or an RSRP associated with first or final SCI in the $x^{th}$ SCI set. The first priority corresponding to the $x^{th}$ SCI set may be a first priority corresponding to SCI included in the $x^{th}$ SCI set.

Optionally, the collision index corresponding to the $x^{th}$ SCI set may be determined based on a quantity of times that the $i^{th}$ periodic resource collides with the first reserved resource in a first window. The first reserved resource is a reserved resource corresponding to the $x^{th}$ SCI set. The reserved resource corresponding to the $x^{th}$ SCI set includes a reserved resource indicated by each piece of SCI in the $x^{th}$ SCI set. For example, based on the example shown in FIG. 5, the reserved resources corresponding to the SCI set 1 include the resource 1, the resource 2, . . . , and the resource Q.

Optionally, the higher layer of the first terminal device may preset a start time domain location and an end time domain location of the first window. Alternatively, the higher layer of the first terminal device may preset a period quantity J for extending the $i^{th}$ resource based on the first period. In this scenario, the start time domain location of the first window is a start time domain location of the $i^{th}$ resource, and the end time domain location is an end location of a final resource obtained after the $i^{th}$ resource is extended by J first periods.

Optionally, the collision index corresponding to the $x^{th}$ SCI set may include a first collision sub-index and/or a second collision sub-index.

Optionally, that the first collision sub-index is determined based on a quantity of times that the $i^{th}$ periodic resource collides with the first reserved resource in the first window may include that the first collision sub-index is determined based on a quantity of resources that are located in the first window in the $i^{th}$ periodic resource, and the quantity of times that the $i^{th}$ periodic resource collides with the first reserved resource in the first window.

For example, the first collision sub-index, the quantity of resources that are located in the first window in the $i^{th}$ periodic resource, and the quantity of times that the $i^{th}$ periodic resource collides with the first reserved resource in the first window may satisfy Formula (i):

$$a_x = C/N1 \tag{1}$$

Herein, $a_x$ is the first collision sub-index, N1 is the quantity of resources that are located in the first window in the $i^{th}$ periodic resource, and C is the quantity of times that the $i^{th}$ periodic resource collides with the first reserved resource in the first window.

Figure 7:
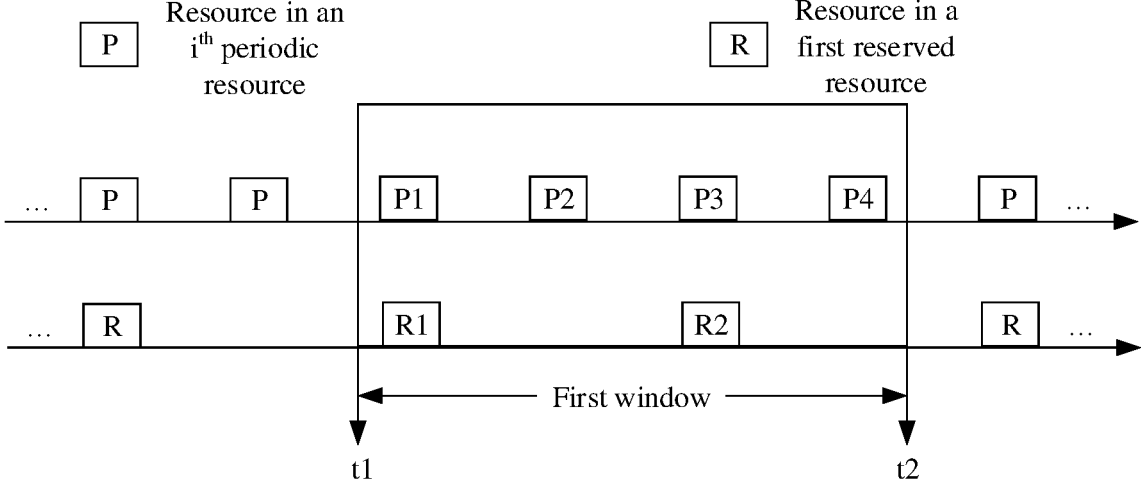
FIG. 7 is a schematic diagram of a resource collision in a window according to an embodiment of this application.

For example, as shown in FIG. 7, that a start time of the first window is t1 and an end time of the first window is t2 is used as an example. Resources located in the first window in the $i^{th}$ periodic resource include a resource P1, a resource P2, a resource P3, and a resource P4. Resources located in the first window in the first reserved resource include a resource R1 and a resource R2. The resource R1 collides with the resource P1, and the resource R2 collides with the resource P3. In this case, a quantity N1 of resources located in the first window in the $i^{th}$ periodic resource is equal to 4, a quantity C of times that the $i^{th}$ periodic resource collides with the first reserved resource in the first window is equal to 2, and a first collision sub-frequency $a_x$ is equal to ½.

Optionally, that the second collision sub-index is determined based on the quantity of times that the $i^{th}$ periodic resource collides with the first reserved resource in the first window may include that the second collision sub-index is determined based on a quantity of resources that are located in the first window in the first reserved resource, and the quantity of times that the $i^{th}$ periodic resource collides with the first reserved resource in the first window.

For example, the second collision sub-index, the quantity of resources that are located in the first window in the first reserved resource, and the quantity of times that the $i^{th}$ periodic resource collides with the first reserved resource in the first window satisfy Formula (2):

$$b_x = C/N2 \tag{2}$$

Herein, $b_x$ is the second collision sub-index, N2 is the quantity of resources that are located in the first window in the first reserved resource, and C is the quantity of times that the $i^{th}$ periodic resource collides with the first reserved resource in the first window.

For example, based on an example shown in FIG. 7, the quantity N2 of resources located in the first window in the first reserved resource is equal to 2, the quantity C of times that the $i^{th}$ periodic resource collides with the first reserved resource in the first window is equal to 2, and a second collision sub-frequency $b_x$ is equal to 1.

In a possible implementation, the first evaluation index, the RSRP associated with the $x^{th}$ SCI set in the X SCI sets, the collision index corresponding to the $x^{th}$ SCI set, the first priority corresponding to the $x^{th}$ SCI set, and the preset priority may satisfy Formula (3.1), (3.2), or (3.3):

$$E = \sum_{x=1}^{X} [-A \cdot a_x \cdot RSRP_x + G\,(prio_{TX}, prio_x)] \tag{3.1}$$

$$E = \sum_{x=1}^{X} [-A \cdot b_x \cdot RSRP_x + G\,(prio_{TX}, prio_x)] \tag{3.2}$$

$$E = \sum_{x=1}^{X} [-A(a_x + b_x)\,RSRP_x + G\,(prio_{TX}, prio_x)] \tag{3.3}$$

Herein, E is the first evaluation index, A is a constant (for example, A is a constant greater than 0), $a_x$ is the first collision sub-index corresponding to the $x^{th}$ SCI set, $b_x$ is the second collision sub-index corresponding to the $x^{th}$ SCI set, $xRSRP_x$ is the RSRP associated with prior the $x^{th}$ SCI set, $prio_{TX}$ is the preset priority, $prio_{TX}$ is the first priority corresponding to the $x^{th}$ SCI set, and $G(prio_{TX}, prio_x)$ is a preset value related to $prio_{TX}$ and $prio_x$. For example, a correspondence exists between $G(prio_{TX}, prio_x)$ and each of $prio_{TX}$ and $prio_x$, and $G(prio_{TX}, prio_x)$ may be determined based on the correspondence, $prio_{TX}$, and $prio_x$. Optionally, A may be configured by the higher layer, or may be preset in the first terminal device. This is not limited.

It may be understood that, when the collision index corresponding to the $x^{th}$ SCI set includes the first collision sub-index but does not include the second collision sub-index, the first evaluation index is determined based on Formula (3.1); when the collision index corresponding to the $x^{th}$ SCI set does not include the first collision sub-index but includes the second collision sub-index, the first evaluation index is determined based on Formula (3.2); or when the collision index corresponding to the $x^{th}$ SCI set includes the first collision sub-index and the second collision sub-index, the first evaluation index is determined based on any one of Formulas (3.1), (3.2), and (3.3).

Optionally, $G(prio_{TX}, prio_x)$ may increase or remain unchanged as the preset priority increases, and decrease or remain unchanged as the first priority corresponding to the $x^{th}$ SCI set increases.

Optionally, $G(prio_{TX}, prio_x)$ may be a value that is preset by the higher layer of the first terminal device and that is related to $prio_{TX}$ and $prio_x$. A unique output value G may be determined based on a pair of $prio_{TX}$, $prio_x$ values. For example, the higher layer of the first terminal device may preset a table. A first column of the table may be a plurality of values of $prio_{TX}$, a second column may be a plurality of values of $prio_x$, and a third column may be values of G. A value of G corresponding to specific values of $prio_{TX}$ and $prio_x$ may be obtained through searching the table. For example, a form of the table may be shown in Table 1. Certainly, the table may be alternatively arranged in another manner, provided that the correspondence between $G(prio_{TX}, prio_x)$ and each of $prio_x$ and $prio_{TX}$ are included. This is not limited in this embodiment of this application.

TABLE 1

| $prio_{TX}$ | $prio_x$ | G |
|---|---|---|
| Priority T1 | Priority x1 | G1 |
| Priority T1 | Priority x2 | G2 |
| Priority T2 | Priority x1 | G3 |
| Priority T2 | Priority x2 | G4 |
| . . . | . . . | . . . |

Optionally, Formulas (3.1), (3.2), and (3.3) may also be respectively represented as Formulas (4.1), (4.2), and (4.3):

$$E = \sum_{x=1}^{X} [A' \cdot a_x \cdot RSRP_x + G\,(prio_{TX}, prio_x)] \tag{4.1}$$

$$E = \sum_{x=1}^{X} [A' \cdot b_x \cdot RSRP_x + G\,(prio_{TX}, prio_x)] \tag{4.2}$$

$$E = \sum_{x=1}^{X} [A'(a_x + b_x)\,RSRP_x + G\,(prio_{TX}, prio_x)] \tag{4.3}$$

Herein, A' is a negative number. For explanations of other parameters, refer to the related description of Formulas (3.1), (3.2), and (3.3). Details are not described herein again.

In another possible implementation, determining the first evaluation index of the $i^{th}$ resource based on the RSRP associated with the $x^{th}$ SCI set in the X SCI sets, the collision index corresponding to the $x^{th}$ SCI set, the first priority corresponding to the $x^{th}$ SCI set, and the preset priority may include the following steps:

(a) Determine, based on the RSRP associated with the $x^{th}$ SCI set in the X SCI sets, the collision index corresponding to the $x^{th}$ SCI set, the first priority corresponding to the $x^{th}$ SCI set, and the preset priority, a second evaluation index of the $i^{th}$ resource corresponding to the $x^{th}$ SCI set. In a specific implementation process, the second evaluation index of the $i^{th}$ resource may also be determined based on one or more of the RSRP associated with the $x^{th}$ SCI set, the collision index corresponding to the $x^{th}$ SCI set, the first priority corresponding to the $x^{th}$ SCI set, and the preset priority. This is not limited in this embodiment of this application.

Optionally, the second evaluation index of the $i^{th}$ resource corresponding to the $x^{th}$ SCI set is a non-increasing function related to one or more of the RSRP associated with the $x^{th}$ SCI set, the first collision sub-index corresponding to the $x^{th}$ SCI set, or the second collision sub-index corresponding to the $x^{th}$ SCI set.

Optionally, the second evaluation index corresponding to the $x^{th}$ SCI set decreases or remains unchanged as the first priority corresponding to the $x^{th}$ SCI set increases. The second evaluation index corresponding to the $x^{th}$ SCI set increases or remains unchanged as the preset priority increases.

For example, the second evaluation index of the $i^{th}$ resource corresponding to the $x^{th}$ SCI set, the RSRP associated with the $x^{th}$ SCI set in the X SCI sets, the collision index corresponding to the $x^{th}$ SCI set, the first priority corresponding to the $x^{th}$ SCI set, and the preset priority satisfy Formula (5.1), (5.2), or (5.3):

$$E_x=-A \cdot a_x \cdot RSRP_x + G(prio_{TX}, prio_x) \qquad (5.1)$$

$$E_x=-A \cdot b_x \cdot RSRP_x + G(prio_{TX}, prio_x) \qquad (5.2)$$

$$E_x=-A(a_x+b_x)RSRP_x + G(prio_{TX}, prio_x) \qquad (5.3)$$

Herein, $E_x$ is the second evaluation index corresponding to the $x^{th}$ SCI set, $E_x$ is a constant (for example, A is a constant greater than 0), $a_x$ is the first collision sub-index corresponding to the $x^{th}$ SCI set, $b_x$ is the second collision sub-index corresponding to the $x^{th}$ SCI set, $RSRP_x$ is the RSRP associated with the $x^{th}$ SCI set, $prio_{TX}$ is the preset priority, $prio_x$ is the first priority corresponding to the $x^{th}$ SCI set, and $G(prio_{TX}, prio_x)$ is a preset value related to $prio_{TX}$ and $prio_x$. Refer to the foregoing related description. Details are not described herein again.

It may be understood that, when the collision index corresponding to the $x^{th}$ SCI set includes the first collision sub-index but does not include the second collision sub-index, the second evaluation index of the $i^{th}$ resource corresponding to the $x^{th}$ SCI set is determined based on Formula (5.1); when the collision index corresponding to the $x^{th}$ SCI set does not include the first collision sub-index but includes the second collision sub-index, the second evaluation index of the $i^{th}$ resource corresponding to the $x^{th}$ SCI set is determined based on Formula (5.2); or when the collision index corresponding to the $x^{th}$ SCI set includes the first collision sub-index and the second collision sub-index, the second evaluation index of the $i^{th}$ resource corresponding to the $x^{th}$ SCI set is determined based on any one of Formulas (5.1), (5.2), and (5-3).

Optionally, Formulas (5.1), (5.2), and (5.3) may also be respectively represented as Formulas (6.1), (6.2), and (6.3):

$$E_x=A' \cdot a_x \cdot RSRP_x + G(prio_{TX}, prio_x) \qquad (6.1)$$

$$E_x=A' \cdot b_x \cdot RSRP_x + G(prio_{TX}, prio_x) \qquad (6.2)$$

$$E_x=A'(a_x+b_x)RSRP_x + G(prio_{TX}, prio_x) \qquad (6.3)$$

Herein, A' is a negative number. For explanations of other parameters, refer to the related description of Formulas (5.1), (5.2), and (5.3). Details are not described herein again. Optionally, A' may be configured by the higher layer, or may be preset in the first terminal device. This is not limited.

(b) Determine the first evaluation index based on X second evaluation indices of the $i^{th}$ resource corresponding to the X SCI sets.

Optionally, the first evaluation index is a sum of the X second evaluation indices; the first evaluation index is an average value of the X second evaluation indices; the first evaluation index is a maximum value in the X second evaluation indices; or the first evaluation index is a minimum value in the X second evaluation indices.

Optionally, step S4022 is as follows:

In a possible implementation, determining, based on the first evaluation index of the $i^{th}$ resource, whether to exclude the $i^{th}$ resource from the initial candidate resource set may include:

when the first evaluation index of the $i^{th}$ resource is less than or equal to a first threshold, excluding the $i^{th}$ resource from the initial candidate resource set. In other words, when the first evaluation index of the $i^{th}$ resource is less than the first threshold, the $i^{th}$ resource may be excluded from the initial candidate resource set. In addition, when the first evaluation index of the $i^{th}$ resource is equal to the first threshold, the $i^{th}$ resource may be excluded from the initial candidate resource set.

Alternatively, when the first evaluation index of the $i^{th}$ resource is less than a first threshold, the $i^{th}$ resource is excluded from the initial candidate resource set. In other words, the $i^{th}$ resource is excluded from the initial candidate resource set only when the first evaluation index of the $i^{th}$ resource is less than the first threshold.

Correspondingly, when the first evaluation index of the $i^{th}$ resource is greater than the first threshold, the $i^{th}$ resource is determined as a resource in the candidate available resource set. Alternatively, when the first evaluation index of the $i^{th}$ resource is greater than or equal to the first threshold, the $i^{th}$ resource is determined as a resource in the candidate available resource set.

Optionally, the first threshold may be configured by the higher layer, or may be specified in a protocol. This is not specifically limited in this application.

In another possible implementation, determining, based on the first evaluation index of the $i^{th}$ resource, whether to exclude the $i^{th}$ resource from the initial candidate resource set may include:

sorting a plurality of first evaluation indices in ascending order, excluding resources corresponding to the first M2 first evaluation indices from the initial candidate resource set, and determining resources corresponding to the last M1 first evaluation indices as resources in the candidate available resource set; or sorting a plurality of first evaluation indices in descending order, excluding resources corresponding to the last M2 first evaluation indices from the initial candidate resource set, and determining resources corresponding to the first M1 first evaluation indices as resources in the candidate available resource set.

Optionally, M1 and M2 may be preconfigured by the higher layer. A sum of M1 and M2 may be equal to M, or may be less than M. This is not limited in this application.

Optionally, M1 may be greater than or equal to a first value. The first value may be a minimum quantity of resources included in the candidate available resource set configured by the higher layer.

Based on this solution, the candidate available resource set meeting a quantity requirement can be directly determined by sorting the first evaluation indices of the M resources, thereby improving resource selection efficiency.

In the foregoing embodiment, the method by using which the first terminal device determines, based on the RSRP associated with the SCI received in the sensing window, the collision index, the first priority corresponding to the SCI received in the sensing window, and the preset priority, whether to exclude the $i^{th}$ resource from the initial candidate resource set is described in detail. In addition, the first terminal device may determine, based on only the RSRP and the collision index that are associated with the SCI received in the sensing window, whether to exclude the $i^{th}$ resource from the initial candidate resource set. Specific implementation is similar to the methods in steps S4021 and S4022. Parameters related to the preset priority and the first priority corresponding to the SCI received in the sensing window are deleted. Refer to the foregoing related description. Details are not described herein again.

In this case, the first terminal device may exclude some resources from the initial candidate resource set based on the SCI received in the sensing window, to determine the candidate available resource set. However, the first terminal device may send data in a specific time unit (referred to as a first time unit below) in the sensing window, and does not listen to SCI sent by another terminal device. The time unit may be a minimum granularity of a resource in this application.

Optionally, in this scenario, it may be assumed that the first terminal device receives specific SCI in the first time unit. If a resource obtained after a resource on which the SCI is located is periodically extended based on a period p partially or completely overlaps a periodic resource corresponding to a specific resource in the initial candidate resource set, the resource is excluded from the initial candidate resource set.

Optionally, the period p is a period supported on an SL. The first terminal device may traverse periods supported by the resource pool, perform, based on each period, periodic extension on the resource on which the SCI is located, and separately determine whether the resource partially or completely overlaps the periodic resource corresponding to the specific resource in the initial candidate resource set. For example, it is assumed that the periods supported by the resource pool are 3, 5, and 9. After periodic extension is performed, based on periods 3 and 5, on the resource on which the SCI is located, the resource does not overlap a periodic resource corresponding to a specific resource in the initial candidate resource set at all. After periodic extension is performed, based on the period 9, on the resource on which the SCI is located, the resource partially or completely overlaps a periodic resource corresponding to a resource in the initial candidate resource set. In this case, the resource is still excluded from the initial candidate resource set.

Optionally, after the candidate available resource set is determined by using the foregoing method, when the quantity of resources included in the candidate available resource set is less than or equal to the first value, the first terminal device may reduce the first threshold; or when the quantity of resources included in the candidate available resource set is less than the first value, the first terminal device may reduce the first threshold. After reducing the first threshold, the first terminal device may perform step S4022 again until the quantity of resources included in the candidate available resource set is greater than the first value.

Optionally, the first value may be Y·M, Y is a preconfigured positive number, and Y is less than 1. Alternatively, the first value may be a preset absolute value, or the first value is a preconfigured integer. This is not limited in this embodiment of this application.

Figure 8:
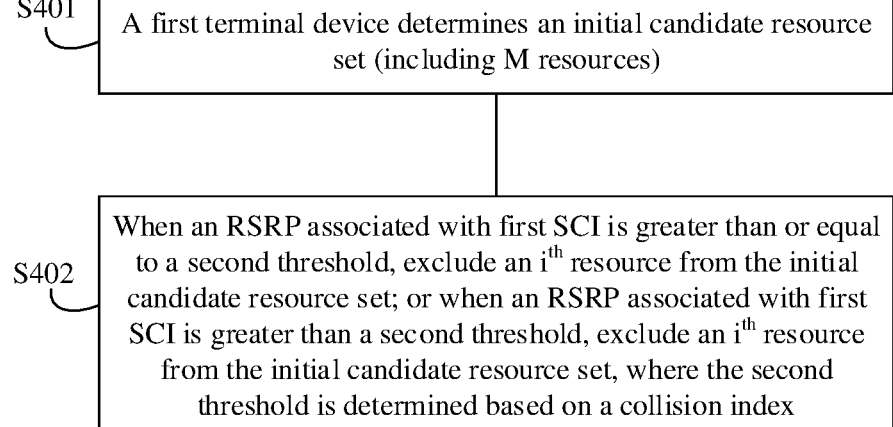
FIG. 8 is a schematic flowchart of still another resource selection method according to an embodiment of this application.

For the second implementation, When the SCI received in the sensing window includes first SCI, a reserved resource indicated by the first SCI is a second reserved resource, and the $i^{th}$ periodic resource partially or completely overlaps the second reserved resource in the first window, as shown in FIG. 8, step S402 in which the first terminal device determines, based on the RSRP and the collision index that are associated with the SCI received in the sensing window, whether to exclude the $i^{th}$ resource from the initial candidate resource set may include the following step:

When the RSRP associated with the first SCI is greater than or equal to a second threshold, the $i^{th}$ resource is excluded from the initial candidate resource set. The second threshold is determined based on the collision index, or the second threshold is determined on the basis of the collision index. In other words, when the RSRP associated with the first SCI is greater than the second threshold, the $i^{th}$ resource may be excluded from the initial candidate resource set. In addition, when the RSRP associated with the first SCI is equal to the second threshold, the $i^{th}$ resource may also be excluded from the initial candidate resource set.

Alternatively, when the RSRP associated with the first SCI is greater than a second threshold, the $i^{th}$ resource is excluded from the initial candidate resource set. The second threshold is determined based on the collision index. In other words, the $i^{th}$ resource is excluded from the initial candidate resource set only when the RSRP associated with the first SCI is greater than the second threshold.

Alternatively, in the second implementation, that the first terminal device determines, based on the RSRP and the collision index that are associated with the SCI received in the sensing window, whether to exclude the $i^{th}$ resource from the initial candidate resource set may include the following step:

When the RSRP associated with the first SCI is less than a second threshold, the $i^{th}$ resource is determined as a resource in the candidate available resource set. In other words, the $i^{th}$ resource is determined as a resource in the candidate available resource set only when the RSRP associated with the first SCI is less than the second threshold.

Alternatively, when the RSRP associated with the first SCI is less than or equal to a second threshold, the $i^{th}$ resource is determined as a resource in the candidate available resource set. In other words, when the RSRP associated with the first SCI is less than the second threshold, the $i^{th}$ resource may be determined as a resource in the candidate available resource set. In addition, when the RSRP associated with the first SCI is equal to the second threshold, the $i^{th}$ resource may also be determined as a resource in the candidate available resource set.

Optionally, for the first window, refer to the related description in the first implementation. Details are not described herein again. The first SCI may be different for different resources in the M resources included in the initial candidate resource set. For example, a reserved resource indicated by first SCI #1 partially or completely overlaps a periodic resource corresponding to a first resource in the M resources, and a reserved resource indicated by first SCI #2 partially or completely overlaps a periodic resource corresponding to a second resource in the M resources.

Optionally, that the second threshold is determined based on the collision index may include that the second threshold is determined based on the collision index, the first priority corresponding to the first SCI, and the preset priority.

Optionally, that the second threshold is determined based on the collision index may include that the second threshold is determined based on a collision index interval corresponding to the collision index. In other words, that the second threshold is determined based on the collision index, the first priority corresponding to the first SCI, and the preset priority may include that the second threshold is determined based on the collision index interval corresponding to the collision index, the first priority corresponding to the first SCI, and the preset priority. In a specific implementation process, the second threshold may be alternatively determined based on one or more of the collision index, the first priority corresponding to the first SCI, and the preset priority. This is not limited in this embodiment of this application.

Optionally, the collision index and the collision index interval corresponding to the collision index may be implemented in the following two manners:

Manner 1: The collision index may include a third collision sub-index and a fourth collision sub-index. The collision index interval corresponding to the collision index includes a first collision index interval and a second collision index interval. The first collision index interval is a collision index interval in which the third collision sub-index is located. The second collision index interval is a collision index interval in which the fourth collision sub-index is located.

In other words, that the second threshold is determined based on the collision index interval corresponding to the collision index, the first priority corresponding to the first SCI, and the preset priority may include that the second threshold is determined based on the collision index interval (that is, the first collision index interval) in which the third collision sub-index is located, the collision index interval (that is, the second collision index interval) in which the fourth collision sub-index is located, the first priority corresponding to the first SCI, and the preset priority.

The third collision sub-index and the fourth collision sub-index are determined based on a quantity of times that the $i^{th}$ periodic resource collides with the second reserved resource in the first window.

Optionally, that the third collision sub-index is determined based on the quantity of times that the $i^{th}$ periodic resource collides with the second reserved resource in the first window may include that the third collision sub-index is determined based on the quantity of resources that are located in the first window in the $i^{th}$ periodic resource, and the quantity of times that the $i^{th}$ periodic resource collides with the second reserved resource in the first window.

For example, the third collision sub-index, the quantity of resources that are located in the first window in the $i^{th}$ periodic resource, and the quantity of times that the $i^{th}$ periodic resource collides with the second reserved resource in the first window may satisfy Formula (7):

$$c=B/N3 \qquad (7)$$

Herein, C is the third collision sub-index, N3 is the quantity of resources that are located in the first window in the $i^{th}$ periodic resource, and B is the quantity of times that the $i^{th}$ periodic resource collides with the second reserved resource in the first window.

Optionally, that the fourth collision sub-index is determined based on the quantity of times that the $i^{th}$ periodic resource collides with the second reserved resource in the first window may include that the fourth collision sub-index is determined based on a quantity of resources that are located in the first window in the second reserved resource, and the quantity of times that the $i^{th}$ periodic resource collides with the second reserved resource in the first window.

For example, the fourth collision sub-index, the quantity of resources that are located in the first window in the second reserved resource, and the quantity of times that the $i^{th}$ periodic resource collides with the second reserved resource in the first window satisfy Formula (8):

$$d=B/N4 \qquad (8)$$

Herein, d is the fourth collision sub-index, N4 is the quantity of resources that are located in the first window in the second reserved resource, and B is the quantity of times that the $i^{th}$ periodic resource collides with the second reserved resource in the first window.

It may be understood that a value range of the collision index in this application is [0, 1]. In Manner 1, the first terminal device may discretize the range [0, 1] into a first collision index interval group and a second collision index interval group. The first collision index interval group and the second collision index interval group may respectively include D1 collision index intervals and D2 collision index intervals. In one collision index interval group, each collision index interval has a unique index.

For example, D1 is equal to 3. Collision index intervals included in the first collision index interval group may be [0, 0.1), [0.1, 0.4), and [0.4, 1]. Indices corresponding to the collision index intervals are respectively 0, 1, and 2. An example in which D2 is equal to 4 is used. Collision index intervals included in the second collision index interval group may be [0, 0.1), [0.1, 0.4), [0.4, 0.6), and [0.6, 1]. Indices corresponding to the collision index intervals are respectively 0, 1, 2, and 3.

Optionally, the first collision index interval may be a collision index interval in which the third collision sub-index in the first collision index interval group is located, and the second collision index interval may be a collision index interval in which the fourth collision sub-index in the second collision index interval group is located. For example, if the third collision sub-index is equal to 0.5, the first collision index interval may be [0.4, 1] in the first collision index interval group, and an index corresponding to [0.4, 1] is 2. For example, if the fourth collision sub-index is equal to 1, the second collision index interval may be [0.6, 1] in the second collision index interval group, and an index corresponding to [0.6, 1] is 3.

The second threshold is determined based on the first collision index interval, the second collision index interval, the first priority corresponding to the first SCI, and the preset priority.

In a possible implementation, the higher layer of the first terminal device may configure an RSRP threshold list for resource selection in an SL scenario. For example, the RSRP threshold list may be configured by using parameter sl-ThresPSSCH-RSRP-List. The threshold list may include P·P·D1·D2 thresholds.

Herein, P indicates a quantity of priorities supported on the SL. Optionally, the preset priority is one of priorities supported on the SL, and the first priority corresponding to the first SCI is one of priorities supported on the SL.

The RSRP threshold list includes the second threshold. In other words, the second threshold belongs to the RSRP threshold list. In other words, the first terminal device may select the second threshold from the RSRP threshold list.

Optionally, a location of the second threshold in the RSRP threshold list may be determined based on an interval index of the first collision index interval in the first collision index interval group, an interval index of the second collision index interval in the second collision index interval group, the priority corresponding to the first SCI, and the preset priority.

For example, the second threshold may be a $K^{th}$ threshold in the RSRP threshold list, and K may satisfy Formula (9.1), (9.2), (9.3), or (9.4):

$$K=prio_{RX}+(prio_{TX}-1)\cdot P+d_1\cdot P\cdot P+d_2\cdot P\cdot P\cdot D_1 \tag{9.1}$$

$$K=prio_{RX}+(prio_{TX}-1)\cdot P+d_2 P\cdot P+d_1\cdot P\cdot P\cdot D_2 \tag{9.2}$$

$$K=d_1+d_2\cdot D_1+prio_{RX}\cdot D_1\cdot D_2+(prio_{TX}-1)\cdot P\cdot D_1\cdot D_2 \tag{9.3}$$

$$K=d_2+d_1\cdot D_2+prio_{RX}\cdot D_1\cdot D_2+(prio_{TX}-1)\cdot P\cdot D_1\cdot D_2 \tag{9.4}$$

Herein, $prio_{RX}$ is the first priority corresponding to the first SCI, $prio_{TX}$ is the preset priority, $d_1$ is an interval index of the first collision index interval in the first collision index interval group, $d_1 \in [0, D_1-1]$, $d_2$ is an interval index of the second collision index interval in the second collision index interval group, and $d_2 \in [0, D_2-1]$.

In another possible implementation, the higher layer of the first terminal device may preconfigure a table, and may determine the corresponding second threshold based on the table, the first collision index interval, the second collision index interval, the first priority corresponding to the first SCI, and a specific value of the preset priority. For example, a form of the table may be shown in Table 2.

Optionally, in Manner 2, the first terminal device may discretize a value range [0, 1] of the collision index into a third collision index interval group. The third collision index interval group may include D collision index intervals. Each collision index interval has a unique index.

For example, D is equal to 3. Collision index intervals included in the third collision index interval group may be [0, 0.2), [0.2, 0.5), and [0.5, 1]. Indices corresponding to the collision index intervals are respectively 0, 1, and 2.

Optionally, a collision index interval corresponding to a collision index may be a collision index interval in which a maximum collision index in the third collision sub-index and the fourth collision sub-index is located. For example, if the third collision sub-index and the fourth collision sub-index are respectively 0.5 and 1, the collision index interval corresponding to the collision index is a collision index interval in which 1 is located.

Alternatively, a collision index interval corresponding to a collision index may be a collision index interval in which a minimum collision index in the third collision sub-index and the fourth collision sub-index is located. For example, if the third collision sub-index and the fourth collision sub-index are respectively 0.5 and 1, the collision index interval corresponding to the collision index is a collision index interval in which 0.5 is located.

Alternatively, a collision index interval corresponding to a collision index may be a collision index interval in which an average collision index of the third collision sub-index and the fourth collision sub-index is located. For example, if the third collision sub-index and the fourth collision sub-index are respectively 0.5 and 1, the collision index interval corresponding to the collision index is a collision index interval in which 0.75 is located.

Alternatively, when the preset priority is lower than or equal to the first priority corresponding to the first SCI, a collision index interval corresponding to a collision index may be a collision index interval in which the fourth collision sub-index is located. For example, if the fourth

TABLE 2

| First collision index interval | Second collision index interval | First priority corresponding to first SCI | Preset priority | RSRP threshold |
|---|---|---|---|---|
| Collision index interval 11 | Collision index interval 21 | Priority 11 | Priority P1 | Threshold 1 |
| Collision index interval 11 | Collision index interval 21 | Priority 11 | Priority P2 | Threshold 2 |
| Collision index interval 12 | Collision index interval 22 | Priority 21 | Priority P1 | Threshold 3 |
| Collision index interval 12 | Collision index interval 22 | Priority 21 | Priority P2 | Threshold 4 |
| . . . | . . . | . . . | . . . | . . . |

It should be noted that Table 2 is merely an example for describing a form of the table. A sequence of the first collision index interval, the second collision index interval, the first priority corresponding to the first SCI, and the preset priority in the table is not specifically limited in this application. For example, the first priority corresponding to the first SCI may be located in the first column in the table, and the preset priority may be located in the second column in the table. This is not limited.

Manner 2: The collision index may include a third collision sub-index and/or a fourth collision sub-index. For the third collision sub-index and the fourth collision sub-index, refer to the related description in Manner 1. Details are not described herein again.

collision sub-index is 1, the collision index interval corresponding to the collision index is a collision index interval in which 1 is located.

Alternatively, when the preset priority is higher than the first priority corresponding to the first SCI, a collision index interval corresponding to a collision index may be a collision index interval in which the third collision sub-index is located. For example, if the third collision sub-index is 0.5, the collision index interval corresponding to the collision index is a collision index interval in which 0.5 is located.

The second threshold is determined based on the collision index interval corresponding to the collision index, the first priority corresponding to the first SCI, and the preset priority.

In a possible implementation, the higher layer of the first terminal device may configure an RSRP threshold list for resource selection in an SL scenario. For example, the RSRP threshold list may be configured by using parameter sl-ThresPSSCH-RSRP-List. The threshold list may include P·P·D thresholds. Herein, P indicates the quantity of priorities supported on the SL.

The RSRP threshold list includes the second threshold. In other words, the second threshold belongs to the RSRP threshold list. In other words, the first terminal device may select the second threshold from the RSRP threshold list.

Optionally, a location of the second threshold in the RSRP threshold list may be determined based on an interval index of the collision index interval corresponding to the collision index in the third collision index interval group, the priority corresponding to the first SCI, and the preset priority.

For example, the second threshold may be an $L^{th}$ threshold in the RSRP threshold list. Herein, L may satisfy Formula (10.1) or (10.2):

$$L=prio_{RX}+(prio_{TX}-1)\cdot P+d\cdot P\cdot P \qquad (10.1)$$

$$L=d+prio_{RX}\cdot D+(prio_{TX}-1)\cdot D\cdot P \qquad (10.2)$$

Herein, $prio_{RX}$ is the first priority corresponding to the first SCI, $prio_{TX}$ is the preset priority, d is an interval index of the collision index interval corresponding to the collision index in the third collision index interval group, and $d\in[0, D-1]$.

In another possible implementation, the higher layer of the first terminal device may preconfigure a table, and may determine the corresponding second threshold based on the table, the collision index interval corresponding to the collision index, the first priority corresponding to the first SCI, and a specific value of the preset priority. For example, a form of the table may be shown in Table 3.

TABLE 3

| Collision index interval | First priority corresponding to first SCI | Preset priority | RSRP threshold |
|---|---|---|---|
| Collision index interval 1 | Priority 11 | Priority P1 | Threshold 1 |
| Collision index interval 1 | Priority 11 | Priority P2 | Threshold 2 |
| Collision index interval 2 | Priority 21 | Priority P1 | Threshold 3 |
| Collision index interval 2 | Priority 21 | Priority P2 | Threshold 4 |
| . . . | . . . | . . . | . . . |

It should be noted that Table 3 is merely an example for describing a form of the table. A sequence of the index of the collision index interval corresponding to the collision index, the first priority corresponding to the first SCI, and the preset priority in the table is not specifically limited in this application. For example, the first priority corresponding to the first SCI may be located in a first column in the table, and the preset priority may be located in a second column in the table. This is not limited.

Optionally, the first terminal device may traverse all SCI received in the sensing window, to determine whether a reserved resource indicated by each piece of SCI partially or completely overlaps the $i^{th}$ periodic resource. If reserved resources indicated by a plurality of pieces of SCI in the SCI received in the sensing window partially or completely overlap the $i^{th}$ periodic resource, the first terminal device may determine a value relationship between an RSRP associated with each of the plurality of pieces of SCI and the second threshold. When an RSRP associated with at least one of the plurality of pieces of SCI is greater than or equal to the second threshold, the $i^{th}$ resource is excluded from the initial candidate resource set. Alternatively, when an RSRP associated with at least one of the plurality of pieces of SCI is greater than the second threshold, the $i^{th}$ resource is excluded from the initial candidate resource set.

In this case, the first terminal device may exclude some resources from the initial candidate resource set based on the SCI received in the sensing window, to determine the candidate available resource set. In addition, when the first terminal device does not listen to SCI of another terminal device in a specific time unit in the sensing window, it may be assumed that the first terminal device receives specific SCI in the time unit, and performs periodic extension on a resource on which the SCI is located, to determine whether the resource partially or completely overlaps a periodic resource corresponding to a specific resource in the initial candidate resource set. If the resource partially or completely overlaps the periodic resource, the resource is excluded from the initial candidate resource set. For details, refer to the related description in the first implementation. Details are not described herein again.

Optionally, after the candidate available resource set is determined by using the foregoing method, when the quantity of resources included in the candidate available resource set is less than or equal to the first value, the first terminal device may enhance the threshold in the RSRP threshold list to which the second threshold belongs; or when the quantity of resources included in the candidate available resource set is less than the first value, the first terminal device may enhance the threshold in the RSRP threshold list to which the second threshold belongs. After enhancing the threshold in the RSRP threshold list to which the second threshold belongs, the first terminal device may perform step S402 again until the quantity of resources included in the candidate available resource set is greater than the first value. For the first value, refer to the related description in the first implementation. Details are not described herein again.

Optionally, in some implementation scenarios, the resource selection method provided in this application may further include the following steps:

The first terminal device sends second SCI. Optionally, the second SCI may include first indication information and second indication information. The first indication information indicates a second resource. The second indication information indicates a first periodic reserved resource. The second resource is a resource released in the first periodic reserved resource. In other words, the first terminal device releases the second resource in the first periodic reserved resource. The second resource may be one or more resources in the first periodic resource.

For example, the first indication information may include one or more of information of the first period, a first time domain resource allocation indication, and a first frequency domain resource allocation indication. The first period is a period of the first periodic reserved resource. A time domain location of the first periodic reserved resource may be determined with reference to the first time domain resource allocation indication and a time domain location of a resource on which the second SCI is located. A frequency domain location of the first periodic reserved resource may be determined based on the first frequency domain resource allocation indication.

Optionally, the second SCI may be SCI corresponding to a $k^{th}$ available resource in a periodic resource corresponding to a first available resource in the candidate available resource set. The periodic resource corresponding to the first available resource includes the first available resource and a resource obtained after the first available resource is extended based on the first period.

Optionally, the first available resource is a resource associated with third SCI in the candidate available resource set. The third SCI is SCI received in the sensing window. That the first available resource is associated with the third SCI may include that the periodic resource corresponding to the first available resource partially or completely overlaps the third reserved resource indicated by the third SCI. In other words, the periodic resource corresponding to the first available resource collides with or conflicts with a third reserved resource indicated by the third SCI.

It may be understood that, when k is equal to 0, the first periodic reserved resource is a periodic resource corresponding to the first available resource; or when k is greater than 0, the first periodic reserved resource includes the $k^{th}$ resource in the periodic resource corresponding to the first available resource and a resource after the $k^{th}$ resource.

Figures 9, 10A:
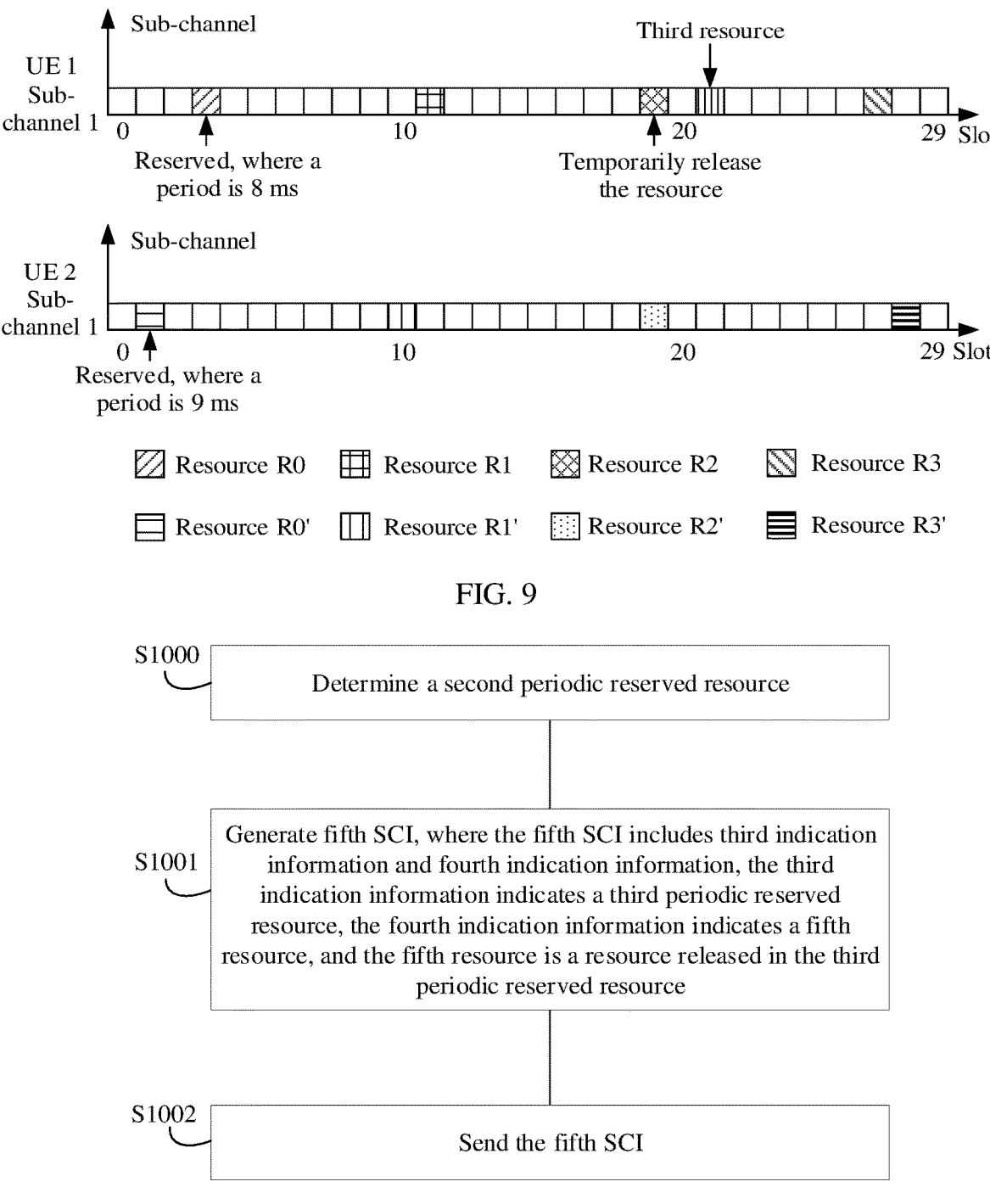
FIG. 9 is a schematic diagram of a resource collision according to an embodiment of this application.
FIG. 10a is a schematic flowchart of yet another resource selection method according to an embodiment of this application.

For example, it is assumed that the first available resource includes a slot 3 in time domain and a sub-channel 1 in frequency domain, and the first period is 8 ms. As shown in FIG. 9, for example, the first terminal device is UE 1, and duration of one slot is 1 ms. The periodic resource corresponding to the first available resource includes a resource R0, a resource R1, a resource R2, and a resource R3. When k is equal to 1, the first periodic reserved resource includes the resource R1, the resource R2, and the resource R3. When k is equal to 2, the first periodic reserved resource includes the resource R2 and the resource R3. When k is equal to 3, the first periodic reserved resource includes the resource R3.

Optionally, the second resource may belong to a first partial resource in the first periodic reserved resource. The first partial resource partially or completely overlaps the third reserved resource indicated by the third SCI. In other words, the second resource partially or completely overlaps, collides with, or conflicts with a reserved resource of another terminal device.

Optionally, an RSRP associated with the third SCI is greater than a third threshold. Further, the third SCI may be any SCI that is received in the sensing window and that is associated with the RSRP greater than the third threshold.

For example, it is assumed that the third SCI is SCI sent by UE 2, a first resource in the third reserved resource indicated by the third SCI includes a slot 1 in time domain and a sub-channel 1 in frequency domain, and a period is 9 ms. As shown in FIG. 9, the third reserved resource includes a resource R0', a resource R1', a resource R2', and a resource R3', and the resource R2' in the third reserved resource overlaps the resource R2 in the periodic resource corresponding to the first available resource. Therefore, the second resource may be the resource R2.

Based on this solution, the first terminal device can indicate, in the SCI, the second resource to be released by the first terminal device. After the another terminal device receives the SCI, if the reserved resource of the another terminal device includes the second resource, because the first terminal device is to release the second resource, the another terminal device may sense that sending data on the second resource does not collide with the first terminal device, and send data on the second resource, thereby improving resource utilization.

Optionally, the first indication information includes a first field. The first field may carry a second value V, and the second resource is a $(V+1)^{th}$ resource after the second SCI in the first periodic reserved resource; or the first field may directly carry V+1. A specific manner of indicating the second resource is not limited in this embodiment of this application. For example, as shown in FIG. 9, when k is equal to 0, the second SCI is sent on the resource R0, and the resource R2 is a second resource after the resource R0. Therefore, the second value V is equal to 1. When k is equal to 1, the second SCI is sent on the resource R1, and the resource R2 is a first resource after the resource R0. Therefore, the second value V is equal to 0.

Optionally, the first terminal device may determine a target index set. The target index set includes a period index corresponding to a resource that collides with the third reserved resource in the periodic resource corresponding to the first available resource. For example, the first terminal device may determine the resource that collides with the third reserved resource in the first available periodic resource, and then determine the period index of the resource as an index in the target index set.

Optionally, when the second SCI is subsequently sent, the value of the second value V may be determined based on Formula (11):

$$V = j' - k - 1 \qquad (11)$$

Herein, j' is a minimum value greater than k in the target index set.

For example, based on the example shown in FIG. 9, the target index set may include a period index 2 of the second resource. When k is equal to 0, j' is equal to 2, and V is equal to 1. When k is equal to 1, j' is equal to 2, and V is equal to 0.

Optionally, after releasing the second resource, the first terminal device may further send a first data packet on a third resource. The first data packet is a data packet planned to be sent on the second resource. The third resource may be a resource that is near the second resource and that is not reserved by another terminal device. For example, a quantity of time units between a time domain location of the third resource and that of the second resource is less than a preset value; and a frequency domain location of the third resource may be the same as that of the second resource, for example, the third resource and the second resource are on a same sub-channel; or a frequency domain location of the third resource may be different from that of the second resource. The time unit is, for example, a slot. For example, as shown in FIG. 9, the time domain location of the third resource may be a slot 21, and a frequency domain location is a sub-channel 1. In other words, the first data packet is sent on the slot 21 and the sub-channel 1 shown in FIG. 9.

On this basis, if a receive device corresponding to the first terminal device enables a discontinuous reception (DRX) mode, and a specific receive window of DRX is close to the time domain location of the second resource, the receive device may temporarily disable DRX after receiving the SCI, so that the receive device can receive data on the third resource, thereby ensuring successful data receiving.

Optionally, after releasing the second resource, the first terminal device may continue to send data on a $(V+2)^{th}$ resource after the second SCI in the first periodic reserved resource.

It may be understood that a method by using which the first terminal device indicates to release a resource may be independently performed without depending on the method in FIG. 4a, FIG. 6, or FIG. 8. To be specific, for a resource reserved by the first terminal device by using any method, the first terminal device may add indication information to the SCI, to indicate a specific resource, so that another terminal device learns that the first terminal device is to release the resource.

Optionally, as shown in FIG. 10*a*, when the method by using which the first terminal device indicates to release a resource is independently performed, the method may include the following steps:

S1000: The first terminal device determines a second periodic reserved resource.

The second periodic reserved resource is used to send a second service transmitted on a second logical channel of the MAC layer of the first terminal device. A period of the second service may be a second period. The second period may be preset by the higher layer.

Optionally, the first terminal device may determine a second periodic reserved resource through channel sensing and selection. For example, the first terminal device may perform step 1 to step 7 to determine the second periodic reserved resource, or may perform the method shown in FIG. 4*a*, FIG. 6, or FIG. 8 to determine the second periodic reserved resource, or may determine the second periodic reserved resource by using another channel sensing and selection method. This is not limited.

For example, the first terminal device may determine a fourth resource in the selection window based on the SCI received in the sensing window, and determine, as the second periodic resource, the fourth resource and a resource obtained after the fourth resource is extended based on the second period.

Optionally, there may be fourth SCI in the SCI received in the sensing window. The fourth SCI indicates the fourth reserved resource. The second periodic resource may partially or completely overlap the fourth reserved resource. In this case, the first terminal device may continue to perform steps S1001 and S1002.

Optionally, an RSRP associated with the fourth SCI is greater than a fourth threshold. The fourth threshold may be preset.

S1001: The first terminal device generates fifth SCI.

Optionally, the fifth SCI may be SCI corresponding to a $k^{th}$ resource in the second periodic reserved resource.

Optionally, the fifth SCI may include third indication information and fourth indication information. The third indication information indicates a third periodic reserved resource. The fourth indication information indicates a fifth resource. The fifth resource is a resource released in the third periodic reserved resource. In other words, the first terminal device releases the fifth resource in the third periodic reserved resource. The fourth resource may be one or more resources in the third periodic reserved resource.

It may be understood that when k is equal to 0, the third periodic reserved resource is the second periodic reserved resource; or when k is greater than 0, the third periodic reserved resource includes a $k^{th}$ resource in a periodic resource corresponding to the second periodic reserved resource and a resource after the $k^{th}$ resource.

Figures 10B, 11:
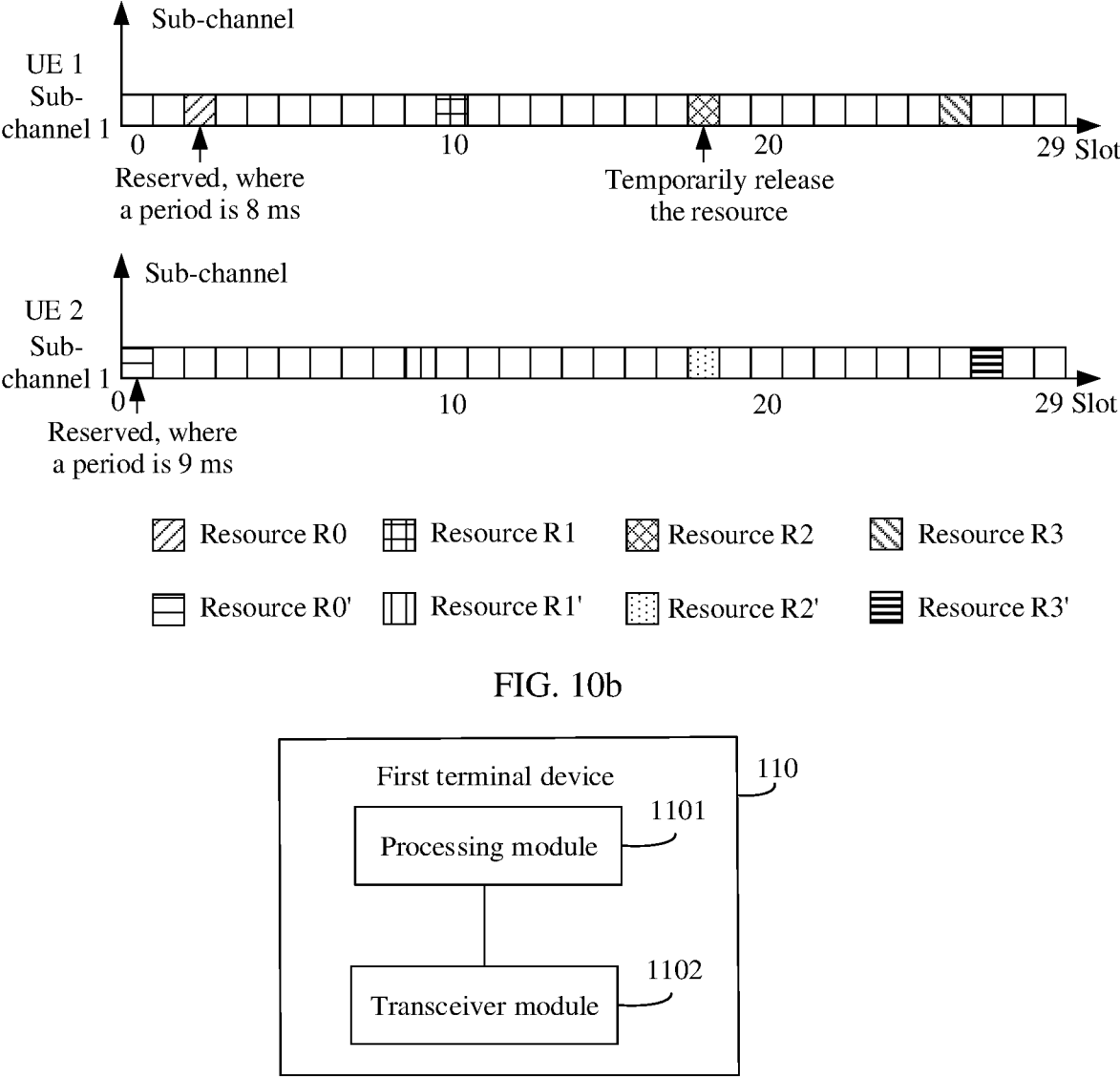
FIG. 10b is a schematic diagram of another resource collision according to an embodiment of this application.
FIG. 11 is a schematic diagram of a structure of a first terminal device according to an embodiment of this application.

For example, it is assumed that the second periodic reserved resource includes a slot 2 in time domain and a sub-channel 1 in frequency domain, and the second period is 8 ms. As shown in FIG. 10*b*, for example, the first terminal device is UE 1, and duration of one slot is 1 ms. The second periodic reserved resource includes a resource R0, a resource R1, a resource R2, and a resource R3. When k is equal to 1, the third periodic reserved resource includes the resource R1, the resource R2, and the resource R3. When k is equal to 2, the third periodic reserved resource includes the resource R2 and the resource R3. When k is equal to 3, the third periodic reserved resource includes the resource R3.

Optionally, the fifth resource may belong to a first partial resource in the third periodic reserved resource. The first partial resource partially or completely overlaps the fourth reserved resource indicated by the fourth SCI. In other words, the fifth resource partially or completely overlaps, collides with, or conflicts with a reserved resource of another terminal device.

For example, it is assumed that the fourth SCI is SCI sent by UE 2, the first resource in the fourth reserved resource indicated by the fourth SCI includes a slot 0 in time domain and a sub-channel 1 in frequency domain, and a period is 9 ms. As shown in FIG. 10*b*, the fourth reserved resource includes a resource R0', a resource R1', a resource R2', and a resource R3', and the resource R2' in the fourth reserved resource overlaps the resource R2 in the second periodic reserved resource. Therefore, the fifth resource may be the resource R2.

Optionally, the fourth indication information may include a second field. The second field may carry a third value V'. The fifth resource is a $(V'+1)^{th}$ resource after the fourth SCI in the third periodic reserved resource. Alternatively, the second field may directly carry V'+1. A manner of indicating the fifth resource is not limited in this embodiment of this application.

For example, as shown in FIG. 10*b*, when k is equal to 0, the fourth SCI is sent on the resource R0, and the resource R2 is a second resource after the resource R0. Therefore, the third value V' is equal to 1. When k is equal to 1, the second SCI is sent on the resource R1, and the resource R2 is a first resource after the resource R0. Therefore, the third value V' is equal to 0.

Optionally, the first terminal device may determine a target index set. The target index set includes a period index corresponding to a resource that collides with the fourth reserved resource in the second periodic reserved resource. When the fifth SCI is sent subsequently, the value of the second value V may be determined based on Formula (12):

$$V'=j'-k-1 \tag{12}$$

Herein, j' is a minimum value greater than k in the target index set.

For example, based on the example shown in FIG. 10*b*, the target index set may include a period index 2 of the fifth resource. When k is equal to 0, j' is equal to 2, and V is equal to 1. When k is equal to 1, j' is equal to 2, and V is equal to 0.

Optionally, after releasing the fifth resource, the first terminal device may further send a second data packet on a sixth resource. The second data packet is a data packet planned to be sent on the fifth resource. For a relationship between the sixth resource and the fifth resource, refer to the foregoing relationship between the second resource and the third resource. Details are not described again.

On this basis, if the receive device corresponding to the first terminal device enables the DRX mode, and a specific receive window of DRX is close to a location of the fifth resource, the receive device may temporarily disable DRX after receiving the SCI, so that the receive device can receive data on the sixth resource, thereby ensuring successful data receiving.

S1002: Send the fifth SCI.

Based on this solution, the first terminal device can indicate, in the SCI, the fifth resource to be released by the first terminal device. After another terminal device receives the SCI, if a reserved resource of the another terminal device includes the fifth resource, because the first terminal device is to release the fifth resource, the another terminal device may sense that sending data on the fifth resource does not collide with the first terminal device, and send the data on the fifth resource, thereby improving resource utilization.

It may be understood that, in the foregoing embodiment, the methods and/or steps implemented by the first terminal device may also be implemented by a component (for example, a processor, a chip, a chip system, a circuit, a logic module, or software) that may be used in the first terminal device.

The foregoing mainly describes the solutions provided in this application. Correspondingly, this application further provides a communication apparatus. The communication apparatus is configured to implement the foregoing methods. The communication apparatus may be the first terminal device in the method embodiments, or an apparatus including the first terminal device, or a component that can be used in the first terminal device, for example, a chip or a chip system.

The foregoing mainly describes the solutions provided in this application. Correspondingly, this application further provides a communication apparatus. The communication apparatus is configured to implement the foregoing methods. The communication apparatus may be the first terminal device in the method embodiments, or an apparatus including the first terminal device, or a component that can be used in the first terminal device, for example, a chip or a chip system.

It may be understood that, to implement the foregoing functions, the communication apparatus includes a corresponding hardware structure and/or software module for performing each function. A person skilled in the art should be easily aware that, the units and the algorithm steps in the examples described with reference to embodiments disclosed in this specification can be implemented in this application by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In this embodiment of this application, the communication apparatus may be divided into functional modules based on the foregoing method embodiment. For example, each functional module may be obtained through division based on each corresponding function, or two or more functions may be integrated into one processing module. The integrated module may be implemented in a form of hardware, or may be implemented in a form of a software functional module. It should be noted that, in this embodiment of this application, division into the modules is an example and is merely logical function division. In actual application, another division manner may be used.

For example, the communication apparatus is the terminal device in the foregoing method embodiment. FIG. 11 is a schematic diagram of a structure of a first terminal device 110. The terminal device no includes a processing module 1101. Optionally, the first terminal device no may further include a transceiver module 1102.

In some embodiments, the terminal device no may further include a storage module (not shown in FIG. 11), configured to store program instructions and data.

In some embodiments, the transceiver module 1102 may also be referred to as a transceiver unit, configured to implement a sending function and/or a receiving function. The transceiver module 1102 may include a transceiver circuit, a transceiver machine, a transceiver, or a communication interface.

In some embodiments, the transceiver module 1102 may include a receiving module and a sending module that are respectively configured to perform receiving steps and sending steps performed by the first terminal device in the method embodiment and/or configured to support another process of the technology described in this specification. The processing module 1101 may be configured to perform processing (for example, determining and obtaining) steps performed by the first terminal device in the method embodiment and/or configured to support another process of the technology described in this specification.

In a possible implementation, The processing module 1101 is configured to determine an initial candidate resource set. The initial candidate resource set includes M resources. Herein, M is a positive integer. The processing module 1101 is configured to determine, based on a reference signal received power RSRP and a collision index that are associated with sidelink control information SCI received in a sensing window by the transceiver module 1102, whether to exclude an $i^{th}$ resource in the M resources from the initial candidate resource set, to obtain a candidate available resource set. Herein, i is a positive integer from 1 to M. The collision index is an index of a collision between a reserved resource indicated by the SCI and an $i^{th}$ periodic resource. The $i^{th}$ periodic resource includes the $i^{th}$ resource and a resource obtained after the $i^{th}$ resource is extended based on a preset first period.

Optionally, the processing module 1101 is further configured to reduce a first threshold when a quantity of resources included in the candidate available resource set is less than or equal to Y·M; or the processing module 1101 is further configured to reduce a first threshold when a quantity of resources included in the candidate available resource set is less than Y·M, where Y is a preconfigured positive number less than 1.

Optionally, the processing module 1101 is further configured to: when a quantity of resources included in the candidate available resource set is less than or equal to Y·M, enhance a threshold in an RSRP threshold list to which a second threshold belongs; or the processing module 1101 is further configured to: when a quantity of resources included in the candidate available resource set is less than Y·M, enhance a threshold in an RSRP threshold list to which a second threshold belongs, where Y is a preconfigured positive number less than 1.

Optionally, the transceiver module 1102 is further configured to send second SCI. The second SCI includes indication information. The indication information indicates a second resource. The second resource is a resource released in a first periodic reserved resource. The first periodic reserved resource is a reserved resource indicated by the second SCI.

All related content of the steps in the method embodiment may be cited in function description of corresponding functional modules. Details are not described herein again.

In this application, the first terminal device no presented in a form of the functional modules obtained through division in an integrated manner. The "module" herein may be an application-specific integrated circuit (application-specific integrated circuit, ASIC), a circuit, a processor that executes one or more software or firmware programs, a memory, an integrated logic circuit, and/or another device that can provide the foregoing functions.

In some embodiments, in hardware implementation, a person skilled in the art may figure out that the first terminal device no may use a form of the communication apparatus 30 shown in FIG. 3.

For example, functions/implementation processes of the processing module 1101 in FIG. 11 may be implemented by the processor 301 in the communication apparatus 30 shown in FIG. 3 by invoking the computer-executable instructions stored in the memory 303. Functions/implementation processes of the transceiver module 1102 in FIG. 11 may be implemented by using the communication interface 304 in the communication apparatus 30 shown in FIG. 3.

In some embodiments, when the first terminal device 110 in FIG. 11 is a chip or a chip system, functions/implementation processes of the transceiver module 1102 may be implemented by using an input/output interface (or a communication interface) of the chip or the chip system, and functions/implementation processes of the processing module 1101 may be implemented by using a processor (or a processing circuit) of the chip or the chip system.

The first terminal device 110 provided in this embodiment can perform the foregoing method. Therefore, for technical effect that can be achieved by the first terminal device no, refer to the foregoing method embodiment. Details are not described herein again.

In a possible product form, the first terminal device in embodiments of this application may be alternatively implemented by using one or more field programmable gate arrays (FPGA), a programmable logic device (PLD), a controller, a state machine, a logic gate, a discrete hardware component, any other appropriate circuit, or any combination of circuits that can perform the various functions described in this application.

Figure 12:
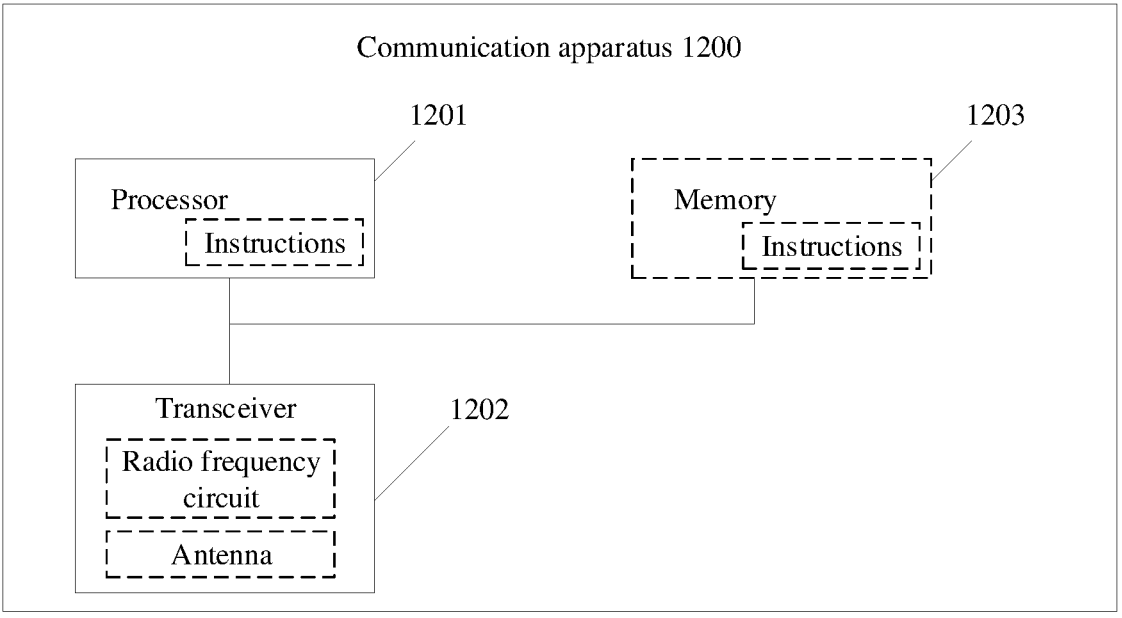
FIG. 12 is a schematic structural diagram of another communication apparatus according to an embodiment of this application.

In another possible product form, the first terminal device in embodiment of this application may be implemented by using a general bus architecture. For ease of description, FIG. 12 is a schematic diagram of a structure of a communication apparatus 1200 according to an embodiment of this application. The communication apparatus 1200 includes a processor 1201 and a transceiver 1202. The communication apparatus 1200 may be a first terminal device or a chip in a first terminal device. FIG. 12 shows only main components of the communication apparatus 1200. In addition to the processor 1201 and the transceiver 1202, the communication apparatus may further include a memory 1203 and an input/output apparatus (not shown in the figure).

The processor 1201 is mainly configured to: process a communication protocol and communication data, control the entire communication apparatus, execute a software program, and process data of the software program. The memory 1203 is mainly configured to store the software program and data. The transceiver 1202 may include a radio frequency circuit and an antenna. The radio frequency circuit is mainly configured to: perform conversion between a baseband signal and a radio frequency signal, and process a radio frequency signal. The antenna is mainly configured to receive and send a radio frequency signal in a form of an electromagnetic wave. The input/output apparatus, such as a touchscreen, a display, or a keyboard, is mainly configured to: receive data input by a user, and output data to the user.

The processor 1201, the transceiver 1202, and the memory 1203 may be connected through a communication bus.

After the communication apparatus is powered on, the processor 1201 may read the software program in the memory 1203, interpret and execute instructions of the software program, and process data of the software program. When data needs to be sent wirelessly, the processor 1201 performs baseband processing on the to-be-sent data, and then outputs a baseband signal to a radio frequency circuit. The radio frequency circuit performs radio frequency processing on the baseband signal, and then sends out a radio frequency signal through the antenna in a form of an electromagnetic wave. When data is sent to the communication apparatus, the radio frequency circuit receives a radio frequency signal through the antenna, converts the radio frequency signal into a baseband signal, and outputs the baseband signal to the processor 1201. The processor 1201 converts the baseband signal into data, and processes the data.

In another implementation, the radio frequency circuit and the antenna may be disposed independently of the processor that performs baseband processing. For example, in a distributed scenario, the radio frequency circuit and the antenna may be disposed remotely and independently of the communication apparatus.

In some embodiments, an embodiment of this application further provides a communication apparatus. The communication apparatus includes a processor, configured to implement the method in any foregoing method embodiment.

In a possible implementation, the communication apparatus further includes a memory. The memory is configured to store a necessary computer program and data. The computer program may include instructions. The processor may invoke the instructions in the computer program stored in the memory, to instruct the communication apparatus to perform the method in any foregoing method embodiment. Certainly, the memory may be alternatively not in the communication apparatus.

In another possible implementation, the communication apparatus further includes an interface circuit. The interface circuit is a code/data read/write interface circuit. The interface circuit is configured to receive computer-executable instructions (the computer-executable instructions are stored in a memory, and may be directly read from the memory or may be read by using another component) and transmit the computer-executable instructions to the processor.

In still another possible implementation, the communication apparatus further includes a communication interface. The communication interface is configured to communicate with a module outside the communication apparatus.

It may be understood that the communication apparatus may be a chip or a chip system. When the communication apparatus is a chip system, the communication apparatus may include a chip, or may include a chip and another discrete device. This is not specifically limited in this embodiment of this application.

This application further provides a computer-readable storage medium. The computer-readable storage medium stores computer programs or instructions. When the computer programs or instructions are executed by a computer, functions in any foregoing method embodiment are implemented.

This application further provides a computer program product. When the computer program product is executed by a computer, functions of any foregoing method embodiment are implemented.

A person of ordinary skill in the art may understand that, for the purpose of convenient and brief description, for a detailed working process of the foregoing systems, apparatuses, and units, reference may be made to a corresponding process in the foregoing method embodiment. Details are not described herein again.

It may be understood that the systems, the apparatuses, and the methods described in this application may be alternatively implemented in another manner. For example, the described apparatus embodiments are merely examples. For example, division into the units is merely logical function division. During actual implementation, another division manner may be used. For example, a plurality of units or components may be combined or integrated into another system, or some features may be ignored or may not be performed. In addition, the displayed or discussed mutual couplings or direct couplings or communication connections may be implemented through some interfaces. Indirect couplings or communication connections between apparatuses or units may be implemented in electrical, mechanical, or other forms.

The units described as separate parts may be physically separated or not, this is, may be located together in the same place or distributed on a plurality of network units. Parts displayed as units may be or may be not physical units. Some or all of the units may be selected according to actual requirements to achieve the objectives of the solutions in embodiments.

In addition, functional units in embodiments of this application may be integrated into one processing unit, or each of the units may exist alone physically, or two or more units may be integrated into one unit.

All or some of the foregoing embodiments may be implemented by software, hardware, firmware, or any combination thereof. When a software program is used to implement embodiments, embodiments may be implemented completely or partially in a form of a computer program product. The computer program product includes one or more computer instructions. When the computer program instructions are loaded and executed on the computer, the procedures or functions according to the embodiments of this application are completely or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like. In embodiments of this application, the computer may include the apparatus described above.

Although this application is described with reference to the embodiments, in a process of implementing this application that claims protection, a person skilled in the art may understand and implement another variation of the disclosed embodiments by viewing the accompanying drawings, disclosed content, and the appended claims. In the claims, the word "comprising" (comprising) does not exclude another component or another step, and "a" or "one" does not exclude a case of a plurality of objects. A single processor or another unit may implement several functions enumerated in the claims. Some measures are recorded in dependent claims that are different from each other, but this does not mean that these measures cannot be combined to produce a good effect.

Although this application is described with reference to specific features and embodiments thereof, it is clear that various modifications and combinations may be made to them without departing from the spirit and scope of this application. Correspondingly, the specification and accompanying drawings are merely example description of this application defined by the appended claims, and are considered as any of or all modifications, variations, combinations, or equivalents that cover the scope of this application. It is clear that a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A method, comprising:
determining an initial candidate resource set, wherein the initial candidate resource set comprises M resources, and M is a positive integer; and
determining, based on a reference signal received power (RSRP) and a collision index that are associated with sidelink control information (SCI) received in a sensing window, whether to exclude an $i^{th}$ resource in the M resources from the initial candidate resource set, to obtain a candidate available resource set, wherein i is a positive integer from 1 to M, and
wherein the collision index is an index of a collision between a reserved resource indicated by the SCI and an $i^{th}$ periodic resource, and the $i^{th}$ periodic resource comprises the $i^{th}$ resource and a resource obtained after the $i^{th}$ resource is extended based on a preset first period.

2. The method according to claim 1, wherein determining, based on the RSRP and the collision index that are associated with the SCI received in the sensing window, whether to exclude the $i^{th}$ resource from the initial candidate resource set comprises:
determining, based on the RSRP associated with the SCI, the collision index, a first priority corresponding to the SCI, and a preset priority, whether to exclude the $i^{th}$ resource from the initial candidate resource set.

3. The method according to claim 2, wherein the SCI received in the sensing window comprises a plurality of pieces of SCI, the plurality of pieces of SCI form X SCI sets, reserved resources corresponding to the X SCI sets partially or completely overlap the $i^{th}$ periodic resource, SCI comprised in an $x^{th}$ SCI set in the X SCI sets corresponds to a same first priority, the collision index comprises X collision indices, the X collision indices are in a one-to-one correspondence with the X SCI sets, X1 is a positive integer greater than 1, X2 is a positive integer less than or equal to X1, and X is a positive integer; and
wherein determining, based on the RSRP associated with the SCI, the collision index, the first priority corresponding to the SCI, and the preset priority, whether to exclude the $i^{th}$ resource from the initial candidate resource set comprises:
determining a first evaluation index of the $i^{th}$ resource based on an RSRP associated with the $x^{th}$ SCI set in the X SCI sets, a collision index corresponding to the x$^{th}$ SCI set, a first priority corresponding to the x$^{th}$ SCI set, and the preset priority, wherein the first priority corresponding to the x$^{th}$ SCI set is a first priority corresponding to the SCI comprised in the x$^{th}$ SCI set, and x is a positive integer from 1 to X; and determining, based on the first evaluation index of the i$^{th}$ resource, whether to exclude the i$^{th}$ resource from the initial candidate resource set.

4. The method according to claim 3, wherein the collision index corresponding to the x$^{th}$ SCI set is determined based on a quantity of times that the i$^{th}$ periodic resource collides with a first reserved resource in a first window, the first reserved resource is a reserved resource corresponding to the x$^{th}$ SCI set, and the reserved resource corresponding to the x$^{th}$ SCI set comprises a reserved resource indicated by each piece of SCI in the x$^{th}$ SCI set.

5. The method according to claim 4, wherein:

the collision index corresponding to the x$^{th}$ SCI set comprises a first collision sub-index or a second collision sub-index;

the collision index corresponding to the x$^{th}$ SCI set being determined based on the quantity of times that the i$^{th}$ periodic resource collides with the first reserved resource in the first window comprises:

the first collision sub-index being determined based on a quantity of resources that are located in the first window in the i$^{th}$ periodic resource, and the quantity of times that the i$^{th}$ periodic resource collides with the first reserved resource in the first window; and the second collision sub-index being determined based on a quantity of resources that are located in the first window in the first reserved resource, and the quantity of times that the i$^{th}$ periodic resource collides with the first reserved resource in the first window.

6. The method according to claim 4, wherein the first evaluation index, the RSRP associated with the x$^{th}$ SCI set in the X SCI sets, the collision index corresponding to the x$^{th}$ SCI set, the first priority corresponding to the x$^{th}$ SCI set, and the preset priority satisfy the following formula:

$$E = \sum_{x=1}^{X} [-A(a_x + b_x) RSRP_x + G(prio_{TX}, prio_x)],$$

wherein

E is the first evaluation index, A is a constant greater than 0, a$_x$ is a first collision sub-index corresponding to the x$^{th}$ SCI set, b$_x$ is a second collision sub-index corresponding to the x$^{th}$ SCI set, RSRP$_x$ is the RSRP associated with the x$^{th}$ SCI set, prio$_{TX}$ is the preset priority, prio$_x$ is the first priority corresponding to the x$^{th}$ SCE set, G(prio$_{TX}$, prio$_x$) is a preset value related to prio$_{TX}$ and prio$_x$, and G(prio$_{TX}$, prio$_x$) increases or remains unchanged as the preset priority increases, and decreases or remains unchanged as the first priority corresponding to the x$^{th}$ SCI set increases.

7. The method according to claim 4, wherein determining the first evaluation index of the i$^{th}$ resource based on the RSRP associated with the x$^{th}$ SCI set in the X SCI sets, the collision index corresponding to the x$^{th}$ SCI set, the first priority corresponding to the x$^{th}$ SCI set, and the preset priority comprises:

determining, based on the RSRP associated with the x$^{th}$ SCI set in the X SCI sets, the collision index corresponding to the x$^{th}$ SCI set, the first priority corresponding to the x$^{th}$ SCI set, and the preset priority, a second evaluation index of the i$^{th}$ resource corresponding to the x$^{th}$ SCI set; and determining the first evaluation index based on X second evaluation indices of the i$^{th}$ resource corresponding to the X SCI sets.

8. The method according to claim 7, wherein the second evaluation index of the i$^{th}$ resource corresponding to the x$^{th}$ SCI set, the RSRP associated with the x$^{th}$ SCI set in the X SCI sets, the collision index corresponding to the x$^{th}$ SCI set, the first priority corresponding to the x$^{th}$ SCI set, and the preset priority satisfy the following formula:

$$E_x = -A(a_x + b_x)RSRP_x + G(prio_{TX}, prio_x), \text{ wherein}$$

E$_x$ is the second evaluation index corresponding to the x$^{th}$ SCI set, A is a constant greater than 0, a$_x$ is a first collision sub-index corresponding to the x$^{th}$ SCI set, b$_x$ is a second collision sub-index corresponding to the x$^{th}$ SCI set, RSRP$_x$ is the RSRP associated with the x$^{th}$ SCI set, prio$_{TX}$ is the preset priority, prio$_x$ is the first priority corresponding to the x$^{th}$ SCI set, G(prio$_{TX}$, prio$_x$) is a preset value related to prio$_{TX}$ and prio$_x$, and G(prio$_{TX}$, prio$_x$) increases or remains unchanged as the preset priority increases, and decreases or remains unchanged as the first priority corresponding to the x$^{th}$ SCI set increases.

9. The method according to claim 7, wherein:

the first evaluation index is a sum of the X second evaluation indices;

the first evaluation index is an average value of the X second evaluation indices;

the first evaluation index is a maximum value in the X second evaluation indices; or the first evaluation index is a minimum value in the X second evaluation indices.

10. The method according to claim 3, wherein determining, based on the first evaluation index of the i$^{th}$ resource, whether to exclude the i$^{th}$ resource from the initial candidate resource set comprises:

when the first evaluation index of the i$^{th}$ resource is less than or equal to a first threshold, excluding the i$^{th}$ resource from the initial candidate resource set; or when the first evaluation index of the i$^{th}$ resource is less than a first threshold, excluding the i$^{th}$ resource from the initial candidate resource set.

11. The method according to claim 3, wherein SCI comprised in a same SCI set in the X SCI sets corresponds to a same first priority, a same period, a same time domain resource allocation indication, and a same frequency domain resource allocation indication, and reserved resources indicated by the SCI comprised in the same SCI set partially or completely overlap.

12. The method according to claim 1, wherein the SCI received in the sensing window comprises first SCI, the i$^{th}$ periodic resource partially or completely overlaps a second reserved resource in a first window, and the second reserved resource is a reserved resource indicated by the first SCI; and wherein determining, based on the RSRP and the collision index that are associated with the SCI, whether to exclude the i$^{th}$ resource in the M resources from the initial candidate resource set comprises:

when the RSRP associated with the first SCI is greater than or equal to a second threshold, excluding the i$^{th}$ resource from the initial candidate resource set; or

51

52 when the RSRP associated with the first SCI is greater than a second threshold, excluding the $i^{th}$ resource from the initial candidate resource set, wherein the second threshold is determined based on the collision index.

13. The method according to claim 12, wherein the second threshold being determined based on the collision index comprises the second threshold being determined based on the collision index, a first priority corresponding to the first SCI, and a preset priority.

14. The method according to claim 12, wherein:

the collision index comprises a third collision sub-index and a fourth collision sub-index, and the third collision sub-index and the fourth collision sub-index are determined based on a quantity of times that the $i^{th}$ periodic resource collides with the second reserved resource in the first window; and the second threshold being determined based on the collision index comprises that the second threshold is determined based on a collision index interval corresponding to the collision index, wherein the collision index interval corresponding to the collision index comprises a first collision index interval and a second collision index interval, the first collision index interval is a collision index interval in which the third collision sub-index is located, and the second collision index interval is a collision index interval in which the fourth collision sub-index is located.

15. The method according to claim 12, wherein:

the second threshold being determined based on the collision index comprises the second threshold being determined based on a collision index interval corresponding to the collision index; and wherein:

the collision index interval corresponding to the collision index is a collision index interval in which a maximum collision index in a third collision sub-index and a fourth collision sub-index is located, and the third collision sub-index and the fourth collision sub-index are determined based on a quantity of times that the $i^{th}$ periodic resource collides with the second reserved resource in the first window;

the collision index interval corresponding to the collision index is a collision index interval in which a minimum collision index in a third collision sub-index and a fourth collision sub-index is located, and the third collision sub-index and the fourth collision sub-index are determined based on a quantity of times that the $i^{th}$ periodic resource collides with the second reserved resource in the first window;

the collision index interval corresponding to the collision index is a collision index interval in which an average collision index of a third collision sub-index and a fourth collision sub-index is located, and the third collision sub-index and the fourth collision sub-index are determined based on a quantity of times that the $i^{th}$ periodic resource collides with the second reserved resource in the first window;

when a preset priority is lower than or equal to a first priority corresponding to the first SCI, the collision index interval corresponding to the collision index is a collision index interval in which a fourth collision sub-index is located, and the fourth collision sub-index is determined based on a quantity of times that the $i^{th}$ periodic resource collides with the second reserved resource in the first window; or when the preset priority is higher than the first priority corresponding to the first SCI, the collision index interval corresponding to the collision index is a collision index interval in which a third collision sub-index is located, and the third collision sub-index is determined based on a quantity of times that the $i^{th}$ periodic resource collides with the second reserved resource in the first window.

16. The method according to claim 14, wherein the third collision sub-index being determined based on the quantity of times that the $i^{th}$ periodic resource collides with the second reserved resource in the first window comprises:

the third collision sub-index is determined based on a quantity of resources that are located in the first window in the $i^{th}$ periodic resource, and the quantity of times that the $i^{th}$ periodic resource collides with the second reserved resource in the first window; and wherein the fourth collision sub-index being determined based on the quantity of times that the $i^{th}$ periodic resource collides with the second reserved resource in the first window comprises:

the fourth collision sub-index is determined based on a quantity of resources that are located in the first window in the second reserved resource, and the quantity of times that the $i^{th}$ periodic resource collides with the second reserved resource in the first window.

17. The method according to claim 1, further comprising:

sending second SCI, wherein the second SCI comprises first indication information, the first indication information indicates a second resource, the second resource is a resource released in a first periodic reserved resource, and the first periodic reserved resource is a reserved resource indicated by the second SCI.

18. The method according to claim 17, wherein the SCI received in the sensing window comprises third SCI, the third SCI indicates a third reserved resource, the second resource belongs to a first partial resource in the first periodic reserved resource, and the first partial resource partially or completely overlaps the third reserved resource.

19. A communication apparatus, comprising:

one or more processors, configured to execute instructions stored in a memory, the instructions including instructions for:

determining an initial candidate resource set, wherein the initial candidate resource set comprises M resources, and M is a positive integer; and determining, based on a reference signal received power (RSRP) and a collision index that are associated with sidelink control information (SCI) received in a sensing window, whether to exclude an $i^{th}$ resource in the M resources from the initial candidate resource set, to obtain a candidate available resource set, wherein i is a positive integer from 1 to M, and wherein the collision index is an index of a collision between a reserved resource indicated by the SCI and an $i^{th}$ periodic resource, and the $i^{th}$ periodic resource comprises the $i^{th}$ resource and a resource obtained after the $i^{th}$ resource is extended based on a preset first period.

20. A non-transitory computer-readable storage medium, wherein the non-transitory computer-readable storage medium stores computer programs or instructions, when the computer programs or the instructions are executed on a communication apparatus, the communication apparatus is enabled to perform operations comprising:

determining an initial candidate resource set, wherein the initial candidate resource set comprises M resources, and M is a positive integer; and determining, based on a reference signal received power (RSRP) and a collision index that are associated with sidelink control information (SCI) received in a sensing window, whether to exclude an $i^{th}$ resource in the M resources from the initial candidate resource set, to obtain a candidate available resource set, wherein i is a positive integer from 1 to M, and wherein the collision index is an index of a collision between a reserved resource indicated by the SCI and an $i^{th}$ periodic resource, and the $i^{th}$ periodic resource comprises the $i^{th}$ resource and a resource obtained after the $i^{th}$ resource is extended based on a preset first period.

\* \* \* \* \*